US011118688B2

(12) United States Patent
Lawrence et al.

(10) Patent No.: US 11,118,688 B2
(45) Date of Patent: Sep. 14, 2021

(54) THROTTLE WITH INTEGRATED FLUID SHUTOFF TRIGGER MECHANISM

(71) Applicant: Caterpillar Inc., Deerfield, IL (US)

(72) Inventors: Rodney Lawrence, Frankfort, IN (US); Brandyn Stack, Lafayette, IN (US); Evan Ramey, Zionsville, IN (US); Anthony Kramer, Mound, MN (US)

(73) Assignee: Caterpillar Inc., Peoria, IL (US)

( * ) Notice: Subject to any disclaimer, the term of this patent is extended or adjusted under 35 U.S.C. 154(b) by 31 days.

(21) Appl. No.: 16/432,360

(22) Filed: Jun. 5, 2019

(65) Prior Publication Data

US 2020/0386322 A1   Dec. 10, 2020

(51) Int. Cl.
| | |
|---|---|
| *F16K 1/22* | (2006.01) |
| *F16K 31/10* | (2006.01) |
| *F02D 9/04* | (2006.01) |
| *F02B 37/18* | (2006.01) |
| *F16K 1/226* | (2006.01) |

(52) U.S. Cl.
CPC ............ *F16K 1/221* (2013.01); *F16K 31/105* (2013.01); *F02B 37/183* (2013.01); *F02D 9/04* (2013.01); *F16K 1/226* (2013.01)

(58) Field of Classification Search
CPC ........ F16K 1/221; F16K 1/226; F16K 31/105; F16K 31/043; F02B 37/183; F02D 9/04; F02D 2009/0277; F02D 2009/0245; F02D 9/1065
USPC ................... 251/68, 101, 107, 114, 292, 291
See application file for complete search history.

(56) References Cited

U.S. PATENT DOCUMENTS

| | | | | |
|---|---|---|---|---|
| 5,036,816 A | * | 8/1991 | Mann | F02M 3/07 123/361 |
| 5,238,220 A | * | 8/1993 | Shell | F16K 1/221 251/67 |
| 5,462,026 A | | 10/1995 | Kumagai | |
| 6,349,925 B1 | | 2/2002 | Tobinai et al. | |
| 6,491,020 B2 | * | 12/2002 | Kotchi | F02D 9/10 123/337 |
| 6,986,860 B2 | * | 1/2006 | Schaefer | F02D 9/1065 264/242 |
| 7,104,253 B1 | * | 9/2006 | Dow | F02M 23/03 123/342 |

(Continued)

FOREIGN PATENT DOCUMENTS

| | | |
|---|---|---|
| EP | 341659 B1 | 7/1991 |
| EP | 2119479 B1 | 1/2017 |

*Primary Examiner* — Craig J Price
*Assistant Examiner* — Andrew J Rost
(74) *Attorney, Agent, or Firm* — Hibshman Claim Construction PLL

(57) ABSTRACT

The present disclosure relates to a fluid supply system for a machine. The fluid supply system includes a throttle assembly having a first shaft attached to a valve member and a fluid shutoff assembly. The fluid shutoff assembly includes a second shaft, a locking member having an axis parallel to an axis of the second shaft and comprising a locking arm extending toward the second shaft, a biasing member fixedly attached to the second shaft, a releasing mechanism adjacent to the locking member that rotates the locking member about the longitudinal axis of the locking member, and a coupler comprising a first coupling hub attached to the first shaft and a second coupling hub attached to the second shaft and interfaced with the first coupling hub.

20 Claims, 17 Drawing Sheets

(56) References Cited

U.S. PATENT DOCUMENTS

| | | | |
|---|---|---|---|
| 7,690,351 B2 | 4/2010 | Kondo | |
| 8,480,054 B2 | 7/2013 | Pintauro | |
| 9,458,941 B2 * | 10/2016 | Bohaychuk | F16H 31/003 |
| 9,677,671 B2 | 6/2017 | Holt | |
| 2001/0045202 A1 * | 11/2001 | Shimura | F02D 11/10 |
| | | | 123/399 |
| 2018/0030936 A1 | 2/2018 | Clapham | |

* cited by examiner

1

THROTTLE WITH INTEGRATED FLUID SHUTOFF TRIGGER MECHANISM

TECHNICAL FIELD

This patent disclosure relates generally to internal combustion engines and, more particularly, to fluid shutoff valves used in internal combustion engines.

BACKGROUND

Certain types of internal combustion engines, including engines that include reciprocating pistons, are typically operated by controlling either the air or fuel provided into engine cylinders. For example, spark ignition engines such as gas or gasoline engines control engine speed by metering an amount of air that is provided to the engine, measuring the amount of air, and providing a controlled amount of fuel to achieve a desired air/fuel ratio. Similarly, compression combustion engines such as diesel or oil engines control engine speed by metering the amount of fuel that is provided to the engine's cylinders. In any event, internal combustion engines require at least air and fuel to form a combustible air/fuel mixture in the engine's cylinders to operate. If providing fuel, or air, is discontinued, then engine operation would be discontinued or prevented from initiating.

In certain conditions, for example, in the presence of a failure, it is desirable to inhibit engine operation for reasons of safety. In yet other conditions, a failure in an engine component may result in an uncontrolled flow of fuel (or air) into the engine, which can create a condition of uncontrolled engine operation. One previously proposed solution at disabling engine operation during either a safety lockout or in the presence of an engine component failure is to introduce an air shutoff valve at a point in the engine's air intake system, which operates to shut off an airflow into the engine.

U.S. Pat. No. 9,677,671 to Marco Holt, describes an armature assembly for a solenoid valve that allows for a valve member to be retained in the closed position through a biasing force being applied therein. A moveably supported armature bolt is movable between a first position and a second position. A valve member is coupled to the armature bolt and is configured to close with the armature bolt at the second position. An armature body is coupled to the armature bolt. A resilient member adapted to hold the armature bolt at the second position so as to retain the valve member in the closed position.

The present disclosure is directed toward overcoming one or more of the problems discovered by the inventors.

SUMMARY

A fluid supply system for a machine is disclosed herein. The fluid supply system comprises a throttle assembly comprising a housing having an inlet, an outlet and a channel therebetween that fluidly connects the inlet and the outlet for supplying fluid to the machine, a valve member disposed within the channel, and a first shaft extending across the channel and coupled to the valve member, the first shaft having a first end and second end opposite the first end and a first longitudinal axis between the first end and second end The fluid supply system also comprises a position controller coupled to the first shaft proximate the first end and operable to rotate the first shaft, wherein rotation of the first shaft moves the valve member between a plurality of positions and a fluid shutoff assembly integrated with the throttle assembly. The fluid shutoff assembly comprises a second shaft comprising a third end adjacent to the second end of the first shaft and a fourth end opposite the third end; a locking member operable to restrain the second shaft in a first position; a biasing member fixedly attached to the second shaft and engaged with the locking member applying a biasing force to the locking member when the second shaft is in the first position, a releasing mechanism operable to move the locking member relative to the biasing member and release the biasing member from contact with the locking member, wherein the biasing member moves the second shaft to a second position in response to the release; and a coupler comprising a first coupling hub fixedly attached to the second end of the first shaft and a second coupling hub fixedly attached to the third end of the second shaft, the first coupling hub interfaced with the second coupling hub, the first coupling hub and the second coupling hub operable to decouple the second shaft from the first shaft when the second shaft is in the first position and couple the second shaft to the first shaft when the second shaft is in the second position.

In another aspect, a throttle assembly is disclosed herein. The throttle assembly comprises a housing having an inlet, an outlet, and a channel therebetween that fluidly connects the inlet and the outlet; a first shaft extending across the channel, the first shaft having a first end, second end opposite the first end, and a first longitudinal axis between the first end and second end; a valve member disposed within the channel, coupled to the first shaft, and rotatable about the first longitudinal axis of the first shaft; a position controller coupled to the first shaft proximate the first end; and a fluid shutoff assembly integrated with the throttle assembly. The fluid shutoff assembly comprises a second shaft comprising a third end adjacent to the second end of the first shaft, a fourth end opposite the third end, and a second longitudinal axis between the third end and fourth end; a locking member having a third longitudinal axis parallel to the second longitudinal axis of the second shaft, the locking member being adjacent to the second shaft and comprising a locking arm extending in a direction from the third longitudinal axis toward the second shaft and rotatable about the third longitudinal axis; a biasing member fixedly attached to the second shaft along the second longitudinal axis and comprising a fillet end; a releasing mechanism adjacent to the locking member that rotates the locking member about the third longitudinal axis; and a coupler comprising a first coupling hub fixedly attached to the second end of the first shaft and a second coupling hub fixedly attached to the third end of the second shaft, the first coupling hub interfaced with the second coupling hub.

In another aspect, a fluid supply system for a machine having a fluid shutoff assembly is disclosed herein. The fluid shutoff assembly comprises a first shaft comprising a first end, a second end opposite the first end, and a first longitudinal axis between the first end and second end; a locking member having a second longitudinal axis parallel to the first longitudinal axis of the first shaft, the locking member being adjacent to the first shaft and comprising a locking arm extending from the second longitudinal axis toward the first shaft and rotatable about the second longitudinal axis; a biasing member fixedly attached to the first shaft along the first longitudinal axis and comprising a fillet end; a releasing mechanism adjacent to the locking member that rotates the locking member about the second longitudinal axis; and a first coupling hub fixedly attached to the first end of the first shaft.

BRIEF DESCRIPTION OF THE FIGURES

The details of embodiments of the present disclosure, both as to their structure and operation, may be gleaned in part by study of the accompanying drawings, in which like reference numerals refer to like parts, and in which.

DETAILED DESCRIPTION

The detailed description set forth below, in connection with the accompanying drawings, is intended as a description of various embodiments and is not intended to represent the only embodiments in which the disclosure may be practiced. The detailed description includes specific details for the purpose of providing a thorough understanding of the embodiments. However, it will be apparent that those skilled in the art will be able to understand the disclosure without these specific details. In some instances, well-known structures and components are shown in simplified form for brevity of description. Some of the surfaces have been left out or exaggerated for clarity and ease of explanation.

The disclosure may reference a top end, top direction, or top and a bottom end, bottom direction or bottom. Generally, references to the top end, top direction, and top are towards a top end 111 of housing 115 of FIG. 2. Generally, references to the bottom end, bottom direction and bottom are towards the bottom end 113 of the housing 115 of FIG. 2.

Figure 1:
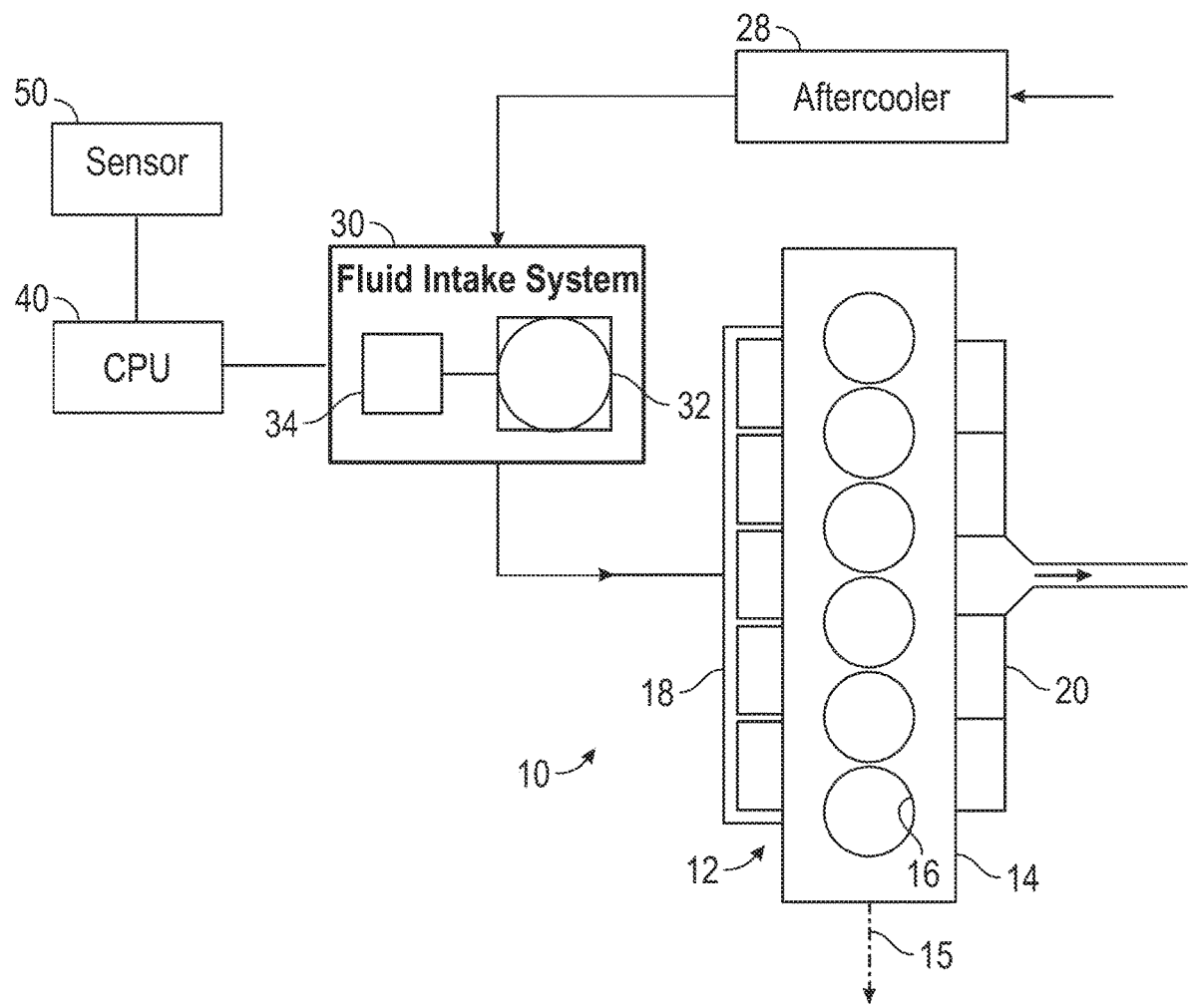
FIG. 1 is a schematic illustration of a machine system.

FIG. 1 is a schematic illustration of an example machine system 10. In accordance with various embodiments, machine system 10 may be an internal combustion engine system, such as might be used for electrical power generation, propulsion power in a mobile machine, operating a pump or compressor, or in a variety of other applications.

Machine system 10 can include a machine 12 such as an internal combustion engine. Machine or engine 12 (hereinafter "engine 12") includes an engine housing 14 having a plurality of cylinders 16 formed therein. A plurality of pistons (not shown) may be movable one within each of cylinders 16 to rotate a crankshaft about a centerline 15 in a generally conventional manner. An intake manifold 18 and an exhaust manifold 20 may be coupled with housing 14. System 10 can further include a fluid intake system 30 structured to supply and control a fluid, such as air other fluids, to intake manifold 18. Exhaust gases may be expelled from exhaust manifold 20 in a generally known manner. An aftercooler 28 may be positioned fluidly prior to fluid intake system 30. The aftercooler 28 receives and cools streams of fluid for feeding to engine 12 before the fluid is passed to the fluid intake system 30. Engine 12 may be coupled with a transmission and/or any other variety of torque transfer devices and loads.

Fluid may be supplied to the fluid intake system 30 via the aftercooler 28 from the surrounding atmosphere, or it may be charged air, such as from a turbocharger or a supercharger (not shown) on a vehicle engine. For example, the fluid intake system 30 may be coupled with one or more turbochargers (not shown) and positioned fluidly after turbochargers and aftercooler 28. Each turbocharger may have a compressor and a turbine, structured to compress and supply a fluid to the aftercooler 28. A single turbocharger design, multiple sequential turbocharger stages, or still other arrangements are contemplated within the present context. Turbines can receive hot exhaust gases from exhaust manifold 20, and rotate to induce rotation of compressors to provide a flow of intake air to engine 12 in a generally known manner. In some embodiments, air drawn from the atmosphere may pass through an air filter (not shown). The charged fluid may then be cooled by the aftercooler 28 and then passed to the fluid intake system 30 for flow regulation, prior to flowing into the intake manifold 18.

The fluid intake system 30 comprises a valve member 32 for controlling fluid flow into the engine 12. Intake shutoff valves may be provided in order to maintain a safe engine operating speed due to the occurrence of a trigger event, for example, in the event of an external fuel source mixed with the air intake. For example, valve member 32 may be biased between opened and closed positions to control fluid flow into the engine. Additionally, it can be desirable to provide mechanisms for shutting off fluid flow to engine 12 in the case of engine overspeeding, runaway conditions, or other emergency shutdown situation (which may also be referred to individually and/or collectively as "trigger events") that can result from the presence of combustible fluids or other materials in the stream of intake air for combustion. Other examples of trigger events may include, but are not limited to high oil temperature, low oil pressure, and discretion of the operator.

To detect trigger events, system 10 may comprise one or more sensors 50 in wired and/or wireless communication with a central processing unit (CPU) 40. Sensors 50 may be used to measure engine parameters used to identify conditions, for example, engine rotations per minute (RPMs), temperature, pressure, flow rates, fluid composition, etc. indicative of one or more trigger events. These conditions may, for example, be an upper RPM threshold of the engine 12 that indicates an engine speed above the normal operation parameters of the engine 12, or a temperature that is beyond the safe range of operation for the engine 12. Other conditions that indicate a potential runaway state may also be used. For example, speed may be measured using a magnetic pick-up on an engine flywheel as a sensor. High oil temperature may be measured by thermocouples and high oil pressure may be measured by pressure transducers, both implemented as sensors (alone or in combination) at multiple locations along an oil galley of engine 12. Oil measurements may be used to indicate if the engine 12 is being lubricated properly. Loss or degradation of oil could cause components to wear prematurely or seize up. A seized bearing could, for example, result in a piston coming through the wall of the engine 12 (ventilated block), which can be very dangerous.

In some embodiments, alone or in combination, an operator may have the ability to manually trigger a shutdown event independent of sensor readings. For example, if there was a gas leak on a work site in which machinery having engine 12 is operating, the operator may want to shut down the engine before the gas is able to be ingested in the engine. A control panel on the engine 12 as well as any remote control panels of the machinery may have an emergency stop button for initiating a trigger event.

Sensors 50 communicate one or more of the measured parameters to CPU 40 via a detection signal. The CPU 40 may process the detection signals to determine current engine conditions and identify whether a trigger event is present or not. In some embodiments, CPU 40 continuously monitors the detection signals to identify, in real-time, the occurrence of a trigger event. If a trigger event is detected, CPU 40 communicates a control signal to the fluid intake system 30 to control the supply of fluid to the engine 12. That is, the control signal causes the fluid shutoff assembly 34 to bias the valve member 32 to a closed position based on the detected conditions. In some embodiments, the throttle may operate the valve member 32 to close, and the fluid shutoff assembly 34 may assist to close and hold the valve member 32 in a fully closed position. In some embodiments, the trigger mechanism may provide an incremental torque configured to assist in holding the valve member closed isolated from dithering of the throttle.

The CPU 40 may be a computer system including a controller, a memory, storage, and an input/output (I/O) interface. These components may be interconnected by a common bus. The controller may be a programmable processor and controls the operation of the CPU and its components. The controller loads instructions from the memory or an embedded controller memory (e.g., RAM, long-term or permanent memory, flash memory, ROM, etc.) and executes these instructions to control the system. In its execution, the controller determines trigger events based on received detection signals, which may be stored in the storage. The I/O interface includes one or more I/O ports to connect to corresponding I/O devices, such as sensors 50 other devices in the system 10. In one embodiment, the ports of the I/O interface include ports such as: USB ports, PCMCIA ports, serial ports, and/or parallel ports. In another embodiment, the I/O interface includes a wireless interface for communication with external devices wirelessly.

Figure 2:
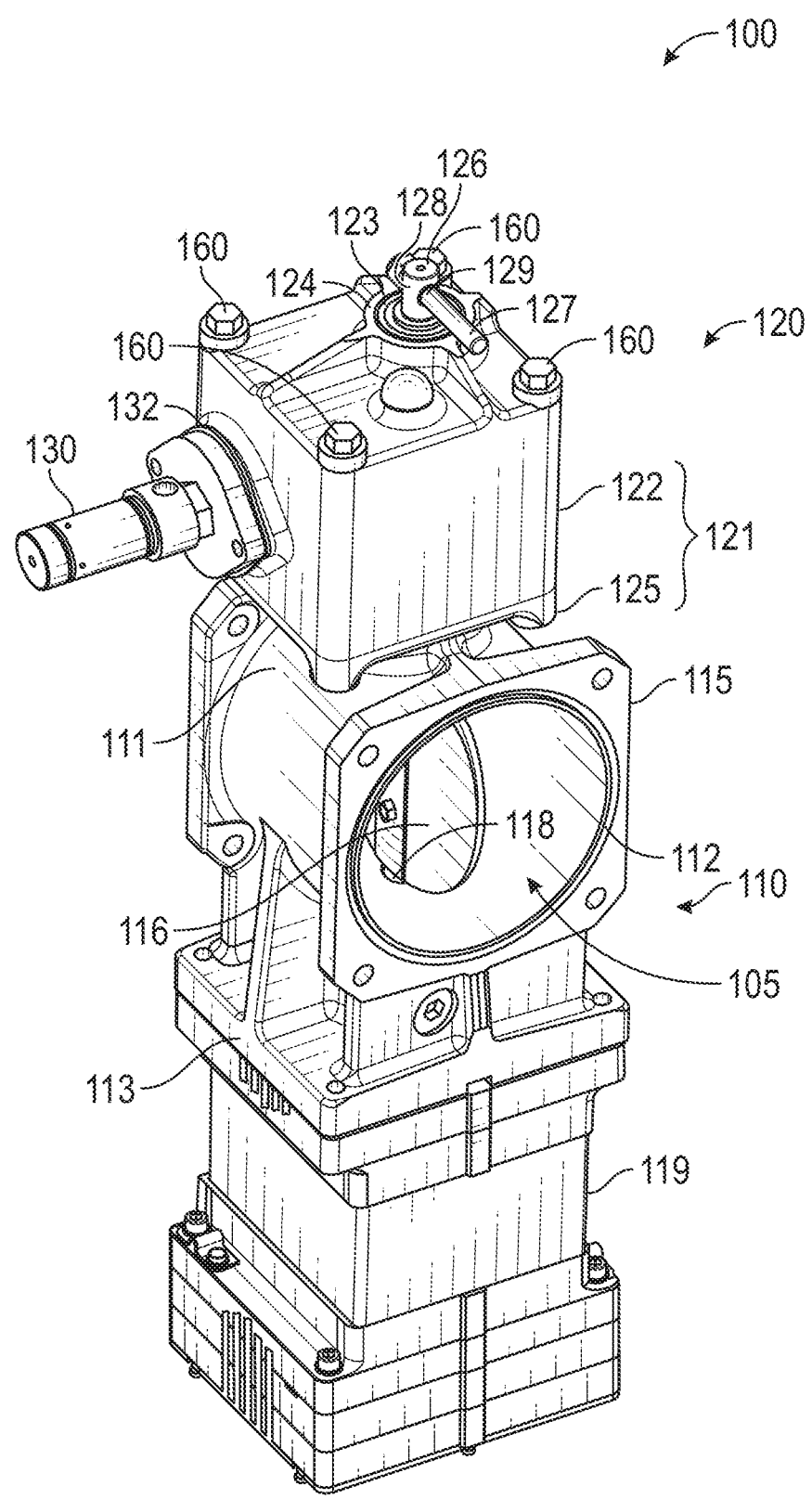
FIG. 2 is a perspective view of an example fluid supply system.

FIG. 2 is a perspective view of an example fluid supply system 100. The fluid intake system 30 of FIG. 1 may be implemented by fluid supply system 100. Fluid supply system 100 comprises a throttle assembly 110 and a fluid shutoff assembly 120 attached to, affixed to, merged with, or integrated with the throttle assembly 110. The throttle assembly 110 comprises a housing 115, a valve member 116 positioned in the housing 115, and an operating shaft 118 coupled with the valve member 116 between ends of the operating shaft 118. The valve member 116 may be a butterfly valve as shown in FIG. 2, although other valve members may also be used as is known in the art. The housing comprises a fluid flow channel 105 extending through the housing 115. The fluid flow channel 105 has an inlet 112 and an outlet (not shown in FIG. 2, but shown in FIG. 12 below as outlet 114) opposite inlet 112 of the channel with the valve member 116 positioned therebetween. As such, fluid may enter the fluid supply system 100 via inlet 112 and pass, based on the position of the valve member 116, through the channel 105 and out outlet, for example, to engine 12 of FIG. 1. The valve member 116 is attached to operating shaft 118, which extends from a bottom 113 of the housing 115 through the channel 105 though a top end 111 of the housing 115. The valve member 116 is coupled to the operating shaft 118 at the center of the valve member 116, such that when the operating shaft is rotated about its longitudinal axis it rotates the valve member 116. The throttle assembly 110 may also comprise a position controller 119 coupled to an end of the operating shaft 118. In some implementations, the position controller 119 may be a servo motor that operates the throttle. In some embodiments, the operating shaft 118 may be attached to the position controller 119 or may extend into the position controller 119. The position controller 119 may comprise one or more electric actuators (not shown) configured to control the position of the valve member 116, by operating on an end of the operating shaft 118, to control various engine functions including (but not limited to) fuel rack positioning, timing control, throttle valve member, and wastegate positioning. The actuators of the position controller 119 may be a positioner that accepts a position command signal from another device in the system such as a speed control from a throttle command. The position controller 119 may also include an integral digital driver capable of controlling the actuator therein, communicating with the outside control system, and containing on-board software and intelligence to realize monitoring and customizing functions. Thus, the command signal from another device in the system may cause the actuators to rotate the operating shaft 118 to a determined position based on the desired function, which in turn moves the valve member in accordance with the shaft rotation. That is, for example, during a full throttle operation, the operating shaft 118 may be controlled by the position controller 119 to move and/or maintain the valve member 116 in a full open position (as shown in FIG. 2) to allow maximum amount of fluid flow through channel 105. Whereas in an idle operation, the operating shaft 118 may be controlled by the position controller 119 to move and/or maintain the valve member 116 in an idle open position to allow a sufficient amount of fluid flow through channel 105. In various embodiments, an idle position may be approximately 60 degrees from full open. In some implementations, the position controller 119 may also control the operating shaft 118 to initiate a full close position.

The fluid shutoff assembly 120 comprises a trigger mechanism housing 121 ("housing"), releasing mechanism 130, and reset handle 127. The housing 121 comprises an upper (or first) portion 122 of housing 121 and a bottom (or second) portion 125 of housing 121. In some embodiments, the housing portions 122 and 125 may be coupled via a bolt 160, screw thread, snap fit, buckles, adhesive, etc. As illustrated in FIG. 2, the bottom portion may be attached to the top end 111 of the throttle assembly 110. The housing 121 may have a port 132 shaped to receive the releasing mechanism 130 configured to activate the fluid shutoff assembly 120 in response to control signals from, for example, CPU 40. In some embodiments, the releasing mechanism 130 may be an actuator, for example, a linear actuator that employs pneumatic, hydraulic, electrical, electro-hydraulic actuation and may also be a single acting cylinder or double-acting cylinder configuration. While the releasing mechanism 130 is illustrated in FIG. 2 as extending from a specific side of the housing 121, other configurations are possible, for example, any of the other sides, top, or bottom of the housing 121.

Housing 121 may also comprise an opening 124 having a trigger shaft 128 extending from within the housing 121 and through opening 124. A bearing 123 (or bushing) may be provided within the opening 124 about trigger shaft 128 to permit rotation about a longitudinal axis of the trigger shaft (not shown) with reduced and/or minimal friction between housing 121 and shaft 128. The trigger shaft 128 may also include a through hole 129 at the end 126 configured to receive reset handle 127. Following a trigger event that causes the trigger mechanism to close valve member 116, reset handle 127 may be operated to reset the trigger mechanism and allow normal operation of the throttle assembly 110.

While FIG. 2 illustrates the fluid shutoff assembly 120 as a separately housed assembly attached to the top end 111 of the housing 115, other configurations are possible within the scope of the present disclosure. For example, the fluid shutoff assembly and throttle assembly 110 may be integrated into a single housing. Additionally, reset handle 127 may be operated by manual intervention and/or automated intervention based on another actuator controlled by CPU.

Figure 3:
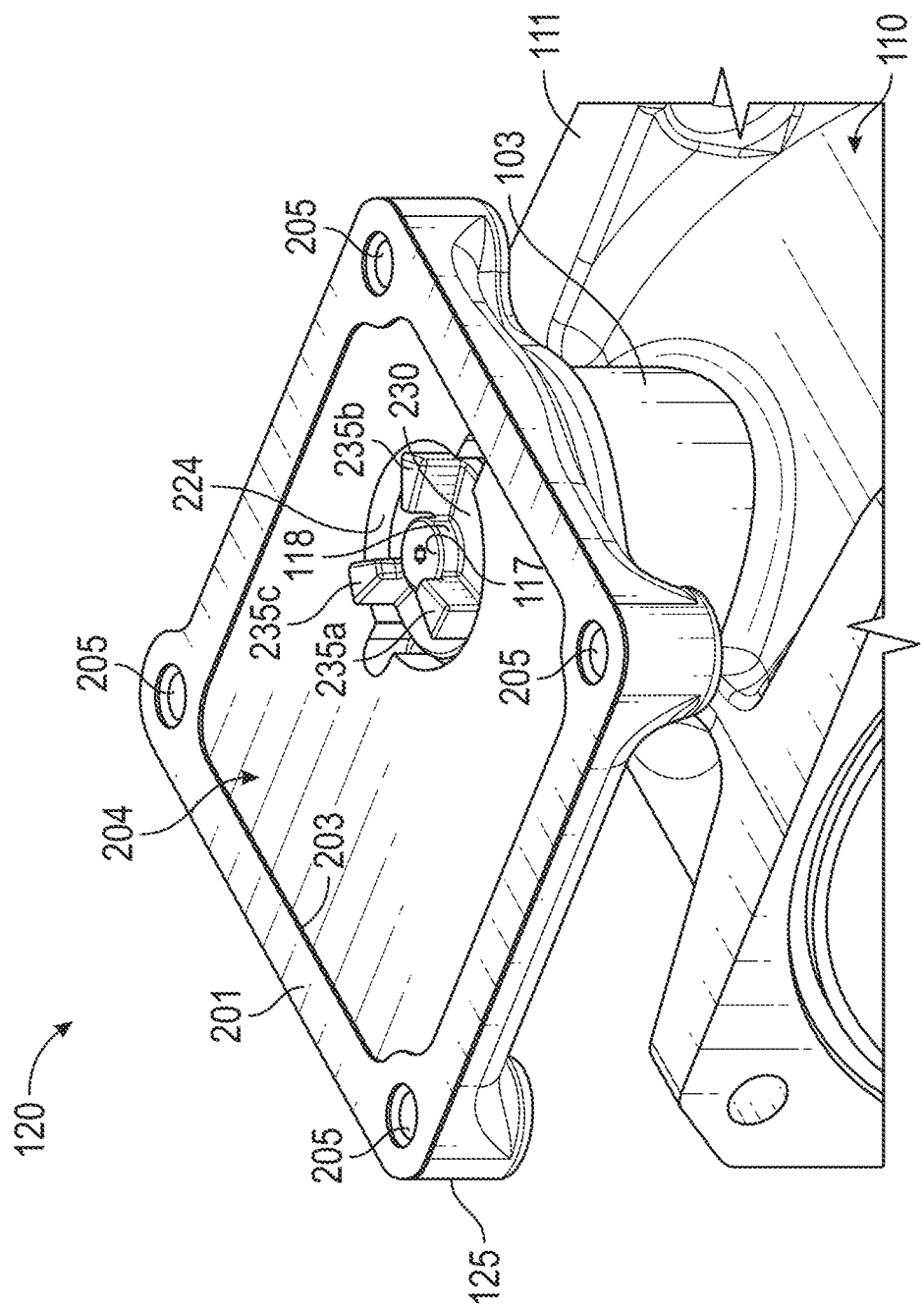
FIG. 3 is a perspective view of a lower portion of an example fluid shutoff assembly included in the fluid supply system of FIG. 2 with the upper portion.

FIG. 3 is a perspective view of the lower portion of the fluid shutoff assembly 120 with the upper portion removed. As shown in FIG. 3, top end 111 of throttle assembly 110 comprises a port 103 to which bottom portion 125 of housing 121 is attached. The upper portion 122 and rest of the fluid shutoff assembly is removed from FIG. 3 for illustrative purposes. Bottom portion 125 comprises wall 203 and surface 201 forming a cavity 204. At the base of cavity 204 and aligned with port 103 is an opening 224. FIG. 3 also depicts a first coupling hub 230 fixedly attached to operating shaft 118 and comprises a plurality of teeth 235a-c (collectively "teeth 235"). The coupling hub 230 is illustrative shown positioned within opening 224, which is shaped to accept the coupling hub 230. However, the opening 224 need only be shaped to permit the operating shaft 118 to pass into the cavity 204, and in some embodiments, the coupling hub 230 may positioned above the opening 224.

Figure 4:
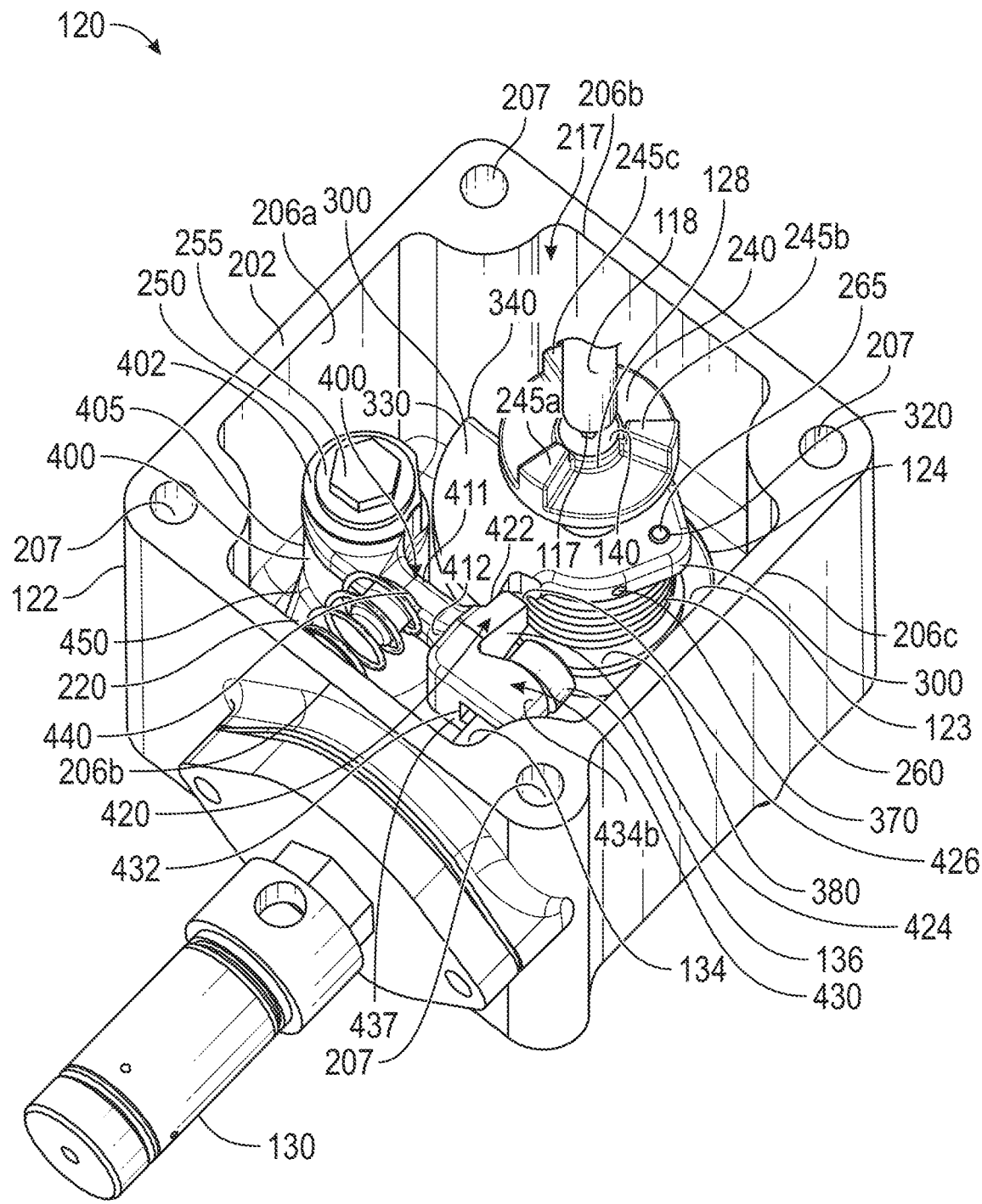
FIG. 4 is a perspective view of an upper portion of the fluid shutoff assembly included in the fluid supply system of FIG. 2 flipped approximately 180 degrees with the lower portion removed.

FIG. 4 illustrates the fluid shutoff assembly 120 within the housing 121 with the housing removed for illustrative purposes. FIG. 4 is a perspective view of the fluid shutoff assembly 120 with the bottom portion 125 removed for illustrative purposes. The shutoff assembly 120 shown in FIG. 4 is flipped approximately 180 degrees from the orientation illustrated in FIG. 2. FIG. 4 also depicts a partial view of shaft 118 having end 117 with the coupling hub 230 removed for illustrative purposes only.

FIG. 4 illustrates upper portion 122 of housing 121 comprising walls 206a-d and surface 202 forming a cavity 217. At the top of cavity 217 is opening 124 and bearing 123. Surface 201 and surface 202 are shaped so to match (e.g., via bolt holes 205 with bolt holes 207) forming an enclosure comprising cavities 204 and 217 and enclosing the various components of the fluid shutoff assembly 120. While housing 121 is described as enclosing the various components of the fluid shutoff assembly 120 and is shown as completely and fully surrounding the components, this need not be the case and housing 121 may partially surround the components as desired for any design requirements. While it may be preferable to enclose cavities 217 and 204 to protect the components, such may not be necessary based on the implementations and environments therein. Thus housing 121 may need only hold or otherwise support the components therein in operational position relative to valve member 116.

Trigger shaft 128 extends from bearing 123 and to end 140 of the trigger shaft 128. End 140 of the trigger shaft may be co-axially aligned with operating shaft 118. That is, trigger shaft 128 has a longitudinal axis extending between end 126 and end 140 that is aligned with the longitudinal axis of operating shaft 118 that extends from the end 117 and through the channel 105, forming a common axis.

The fluid shutoff assembly 120 also comprising a second coupling hub 240 having a corresponding longitudinal axis aligned with the longitudinal axis of the trigger shaft. Second coupling hub 240 may be fixedly attached (e.g., by screws, bolts, adhesive, welding, etc.) to trigger shaft 128 and comprises a plurality of teeth 245a-c (collectively "teeth 245").

A latch 300 and torsion spring 260 (sometimes collectively referred to herein as "biasing member") are included in the fluid shutoff assembly 120, each having a corresponding longitudinal axis aligned with the longitudinal axis of the trigger shaft 128. Latch 300 may be fixedly attached to trigger shaft 128 between the second coupling hub 240 and torsion spring 260, for example, via through hole 370. The torsion spring 260 has an end 265 that is attached to latch 300 via a through hole 320 and is positioned between the top of upper portion 122 of housing 121 and the latch 300. A thrust washer 380 may be provided between the housing 121 and torsion spring 260.

Fluid shutoff assembly 120 also includes a locking member 400 (sometimes referred to herein as "lever assembly 400") spaced apart from the trigger shaft 128 and attached to upper portion 122 of housing 121. For example, locking member 400 may be attached to housing 121 via bolt 255 and washer 250. As illustrated in FIG. 4, locking member 400 is in contact with the latch 300, such that the latch 300 applies a pushing force to locking member 400 based on a wound state of torsion spring 260. As such, the fluid shutoff assembly 120, and thus trigger shaft 128, is restrained in a locked position or first position.

Figure 5:
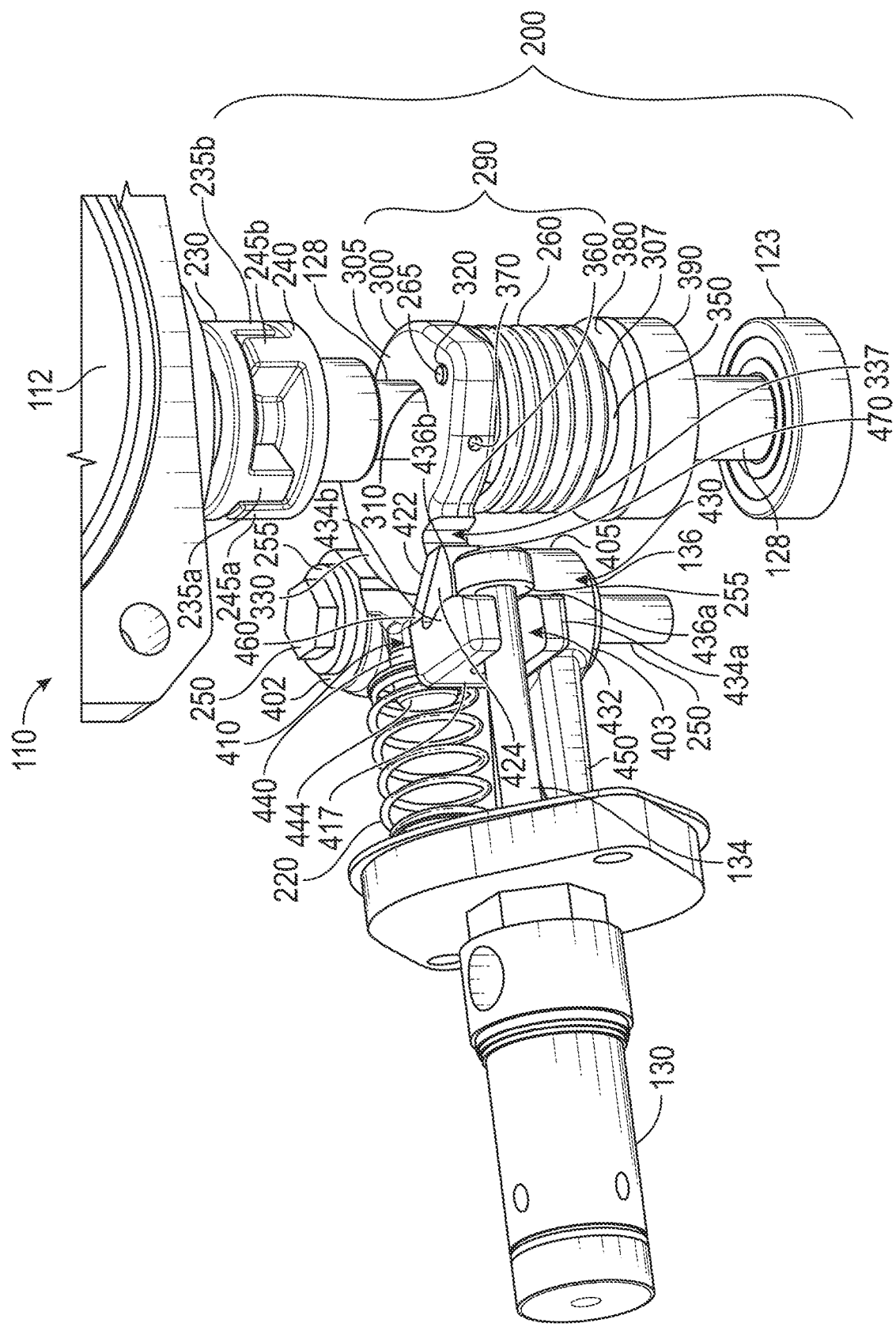
FIG. 5 is a perspective view of the fluid shutoff assembly included in the fluid supply system of FIG. 2 with the housing removed.
Figure 6:
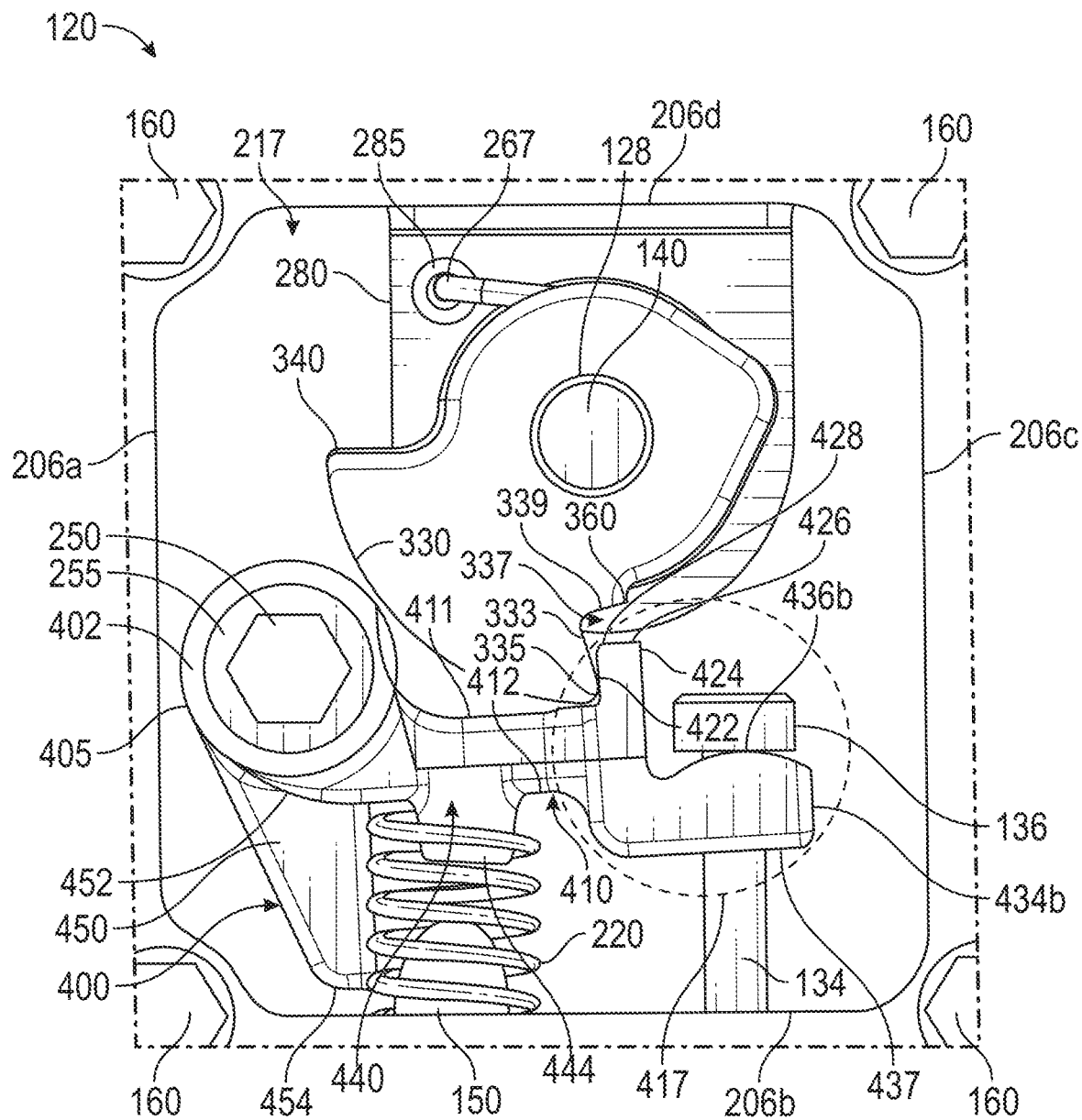
FIG. 6 is a principle plane view of the fluid shutoff assembly included in the fluid supply system of FIG. 2 with the lower portion removed.

FIGS. 5 and 6 illustrate schematic views of the fluid shutoff assembly 120. FIG. 5 is a perspective view of the fluid shutoff assembly 120 with housing 121 removed for illustrative purposes. The orientation of FIG. 5 is flipped approximately 180 degrees relative to the orientation of FIG. 2. FIG. 5 illustrates throttle assembly 110 and inlet 112. FIG. 5 also depicts a trigger mechanism 200 of fluid shutoff assembly 120, which comprises the first coupling hub 230 attached to end 117 of operating shaft 118, second coupling hub 240 attached to end 140 of trigger shaft 128, trigger shaft 128, locking member 400, releasing mechanism 130, and a biasing member 290. The biasing member 290 may comprise the latch 300 and the torsion spring 260. FIG. 6 is a principle plane view of the trigger mechanism 200 of FIG. 5 viewed along the longitudinal axis of shaft 128 with the bottom portion 125 of housing 121 and coupling hub 240 removed for illustrative purposes only.

Referring to FIGS. 5 and 6, locking member 400 comprises a cylindrical body 405 with a longitudinal axis between a first end 402 and a second end 403. The cylindrical body 405 comprises a through hole 407 along its longitudinal axis arranged to accept bolt 255 and washer 250. A sleeve (not shown) may be provided within through hole 407 that accepts a bushing (not shown) to facilitate rotation of the locking member 400 about its longitudinal axis.

The trigger mechanism 200 comprises coupling hub 230 and coupling hub 240 (collectively "a coupler") are arranged to interface with each other. The coupler may be of a jaw coupling type without a spider insert, as illustrated, however other couplers are possible. While each coupling hub is illustrated with three teeth, other configurations are possible. For example, two teeth, four teeth, five teeth, etc. In some embodiments, the coupling hubs 230 and 240 may comprise corresponding faces that form a spline interface.

In an example embodiment, coupling hub 230 is attached to operating shaft 118 and comprises a plurality of teeth 235a-c (collectively "teeth 235") and coupling hub 240 is attached to trigger shaft 128 and comprising a plurality of teeth 245a-c (collectively "teeth 245"). The teeth 235 and 245 may be interspersed about each respective coupling hub having gaps therebetween. For example, teeth may be arranged at increments of 120 degrees with each tooth corresponding to 60 degrees of radial space and having a gap between each tooth of approximately 60 degrees. As another example, teeth may be arranged at increments of 180 degrees with each tooth corresponding to 120 degrees of radial space and having a gap between each tooth of approximately 60 degrees. In some embodiments, there may be approximately five degrees of breathing room.

As shown in FIG. 5, locking member 400 comprises a longitudinal axis extending between ends 402 and 403 that is parallel to the longitudinal axis of the trigger shaft 128 and spaced apart from each other. Locking member 400 also comprises locking arm 410 at end 402 having a first face 411 and a second face 412. Locking member 400 extends from the cylindrical body 405 to a distal end 417 toward wall 206c off centered from the longitudinal axis of the locking member 400 toward the wall 206b and extends in a direction parallel to the longitudinal axis of the locking member 400.

The distal end 417 of the locking arm 410 comprises a catch 420 and a seat 430. The catch 420 extends from first face 411 of the locking arm 410 in a direction toward the biasing member 290 and comprises a catch surface 422, catch end 426, and a surface 424. The catch 420 also comprises a non-perpendicular corner 428 between catch surface 422 and catch end 426.

The seat 430 extends generally from the distal end 417 in the same direction of the locking arm 410 and is off-set from face 412 in a direction opposite of the catch 420. The seat 430 comprises a first extension 434a and a second extension 434b separated by a through hole 432. Extensions 434a, 434b each have a front surface 436a, 436b, respectively, and rear surface 437. In various embodiments, the front surfaces 436a, 436b may comprise a convex or rounded contoured surface.

The seat 430 is arranged to receive the releasing mechanism 130. The releasing mechanism 130 may comprise a solenoid 134 and a head 136. The solenoid 134 may extend, for example, from the wall 206b and pass through the through hole 432 to head 136 adjacent to the front surfaces 436a and 436b of the seat 430. In some embodiments, the head 136 may rest in contact with the front surfaces 436a, 436b, while in others the head 136 may not contact the front surfaces 436a, 436b until activated.

The locking arm 410 also comprises a stabilizing seat 440. The stabilizing seat 440 extends from face 412 in a direction away from the catch 420 (e.g., toward wall 206b) and comprises a stabilizing surface 444. The stabilizing seat 440 may be a circular surface substantially flat along the face 412 and the stabilizing surface 444 may be a raised rounded surface at the center of the stabilizing seat 440. The stabilizing seat 440 may accept a stabilizing spring 220 (sometimes referred to herein as a "stabilizer"). For example, stabilizing seat 440 may be inserted within windings of stabilizing spring 220, such that the stabilizing surface 444 extends into the stabilizing spring 220 so to secure the stabilizing spring 220. The upper portion 122 of housing 121 may comprise a similar but opposite stabilizing surface 150. Thus, the stabilizing spring 220 may be held in a compressed state between face 412 of locking member 400 and housing 121. This configuration may assist in pushing the locking member 400 using stabilizing force to maintain an inactivated or locked position.

Locking member 400 may also comprise a lever arm 450 that extends from its longitudinal axis in a direction generally perpendicular to the locking arm 410 and, for example, toward wall 206b. In some embodiments, the lever arm 450 may comprise a stop 454 at its distal end and arranged to ensure that the locking member 400 can be properly installed and does not overtravel. The lever arm 450 may comprise an end 452 that is connected to the cylindrical body 405 near the end 403 and the stop 454.

The trigger mechanism 200 includes biasing member 290 that comprises latch 300 and torsion spring 260. Latch 300 comprises a cylindrical body portion 350 having a corresponding longitudinal axis extending between surface 305 to end 307 and aligned with the longitudinal axis of the trigger shaft 128. Latch 300 also has a cam lobe 330 having an outer edge connecting locking fillet end 335 and return lobe lift 340. Locking fillet end 335 may also be referred to as a "fillet," "round," "end," "corner" or any combination thereof. Return lobe lift 340 may be aligned with the center of through hole 310. Latch 300 may also include cutout 337 formed between locking fillet end 335 and point 360. Cutout 337 may have an angle θ of approximately 90 degrees between edge 333 and edge 339.

Latch 300 is attached to trigger shaft 128 via through hole 310 arranged to accept the trigger shaft 128. Biasing member 290 also may include torsion spring 260 having a corresponding longitudinal axis aligned with the longitudinal axis of the trigger shaft 128. Latch 300 may be fixedly attached to trigger shaft 128 between the second coupling hub 240 and torsion spring 260, for example, via through hole 370. The torsion spring 260 is attached to latch 300 at end 265 via a through hole 320 and is positioned between the top of upper portion 122 of housing 121 and the latch 300. As shown in FIG. 6, a plate 280 may be attached to the upper portion 122 of housing 121 and fixedly attached to a second end of the torsion spring 260 via through hole 285. That is, the end 267 of torsion spring 260 may be inserted into through hole 285 and attached thereto. A thrust washer 380 and bearing 390 may be provided between the housing 121 and torsion spring 260. In some embodiments, end 267 of torsion spring 260 may be attached to a thrust washer 380 positioned adjacent to the torsion spring 260. In some embodiments, the end 267 may extend through the length of the thrust washer 380. In such embodiments, the thrust washer 380 may need to have a diameter that is larger than the diameter of bearing 390 such that the end 267 does not interfere with the bearing 390.

Bearing 390 may be provided between the housing 121 and thrust washer 380. Thrust washer 380 and bearing 390 may be disposed along the longitudinal axis of the trigger shaft 128 with the bearing 390 adjacent to the washer 380 and between thrust washer 380 and housing 121. The bearing 390 and bearing 123 may be disposed within the opening 124 of the upper portion 122 of the housing 121 to facilitate uninhibited rotation of the trigger shaft 128 while passing through the opening 124.

As illustrated in FIG. 6, the latch 300 is aligned with the locking arm 410. For example, the surface 305 and opposite surface of the latch 300 are parallel to a top surface 460 and a bottom surface 470 of the locking arm 410. Additionally, the surface 305, the surface opposite surface 305 of latch 300, or both surfaces may be aligned at either the approximate same longitudinal position as top surface 460 and/or bottom surface 470 or between the top surface 460 and bottom surface 470 along the longitudinal axis of the trigger shaft 128.

As illustrated in FIG. 6, biasing member 290 in contact with the locking member 400. For example, in the position illustrated in FIG. 6, the cam lobe 330 of latch 300 is positioned adjacent to and in contact with the locking member 400. In various embodiments, the locking fillet end 335 is positioned in contact with catch surface 422 of locking member 400. The locking fillet end 335 may be in contact face 411 alone or in combination with catch surface 422. Thus, based on a torsion force applied to latch 300, a locking force is applied to the locking member 400 at the catch surface 422. This locking force applies a torque locking the trigger mechanism 200 in the illustrated position.

While embodiments are described herein as using bushing or bearing, it will be appreciated that the examples through this disclosure are not to be limited to the specific implementation. Bushings and bearings may be interchangeable based on design specifications and packaging restrictions. Furthermore, some embodiments may comprise one or more other bearings and/or bushings not shown in the figures here, for example, a bearing may be provided between the coupling hub 240 and latch 300 configured, for example, to carry the load.

Figure 7:
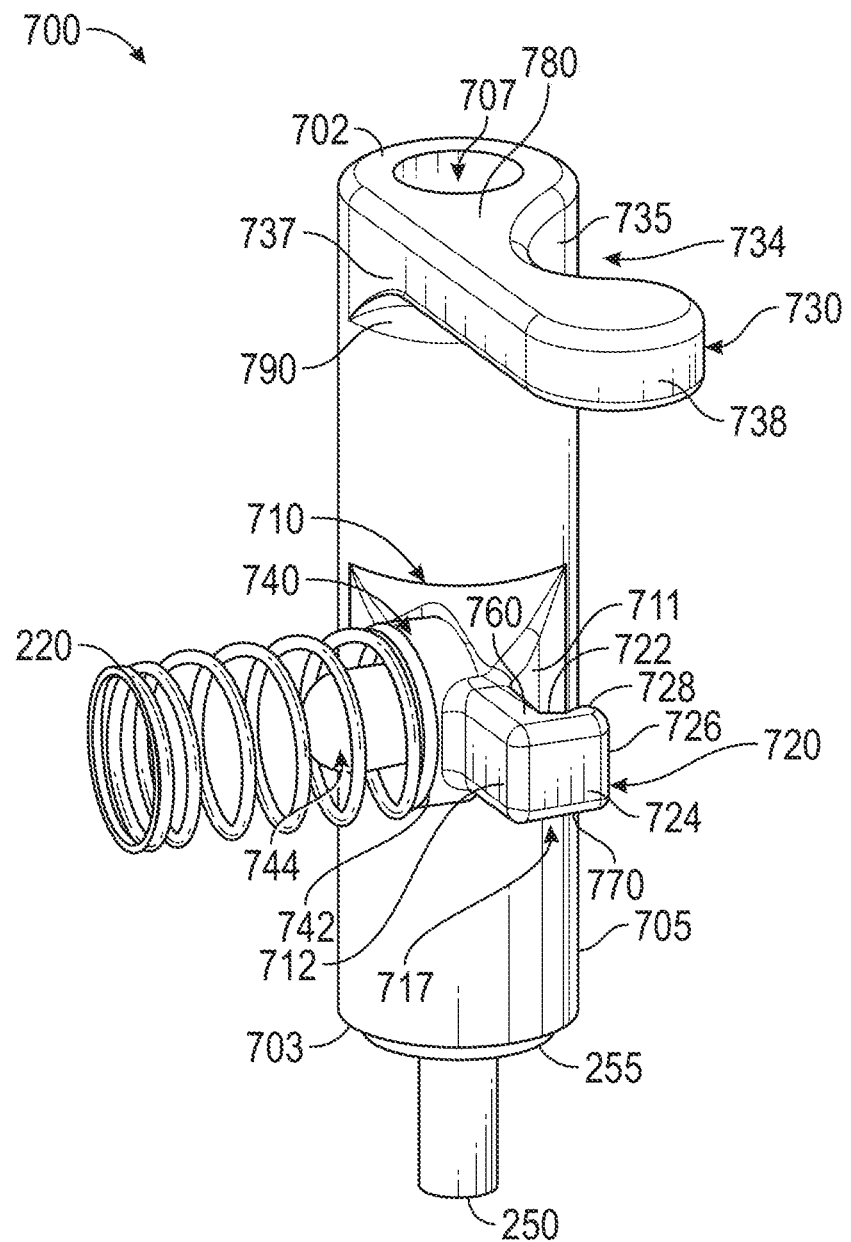
FIG. 7 is a perspective view of an example locking member.

FIG. 7 illustrates a perspective view of another embodiment of a locking member that can be implemented in accordance with the present disclosure. In one embodiment of the fluid shutoff assembly, a locking member 700 may be used in place of locking member 400. In this embodiment, many of the components discussed previously are utilized again in substantially the same manner, and thus the same reference numerals will be used to refer to like parts. Description to like numbered parts may be omitted in the following description, but it will be appreciated that the description above to like numbered parts applies equally to each and every embodiment described in the present disclosure.

Turning to FIG. 7, locking member 700 comprises a cylindrical body 705 having a locking arm 710 and releasing arm 730, both protruding from cylindrical body in substantially the same direction. Releasing arm 730 may be positioned at or adjacent to end 702 of the cylindrical body 705 and locking arm 710 is positioned along the cylindrical body between ends 702 and 703. The cylindrical body 705 comprises a longitudinal axis between the first end 702 and the second end 703 and a through hole 707 along its longitudinal axis. The through hole 707 may be arranged to accept bolt 255 and washer 250. A sleeve (not shown) may be provided within through hole 707 that accepts a bushing (not shown) to facilitate rotation of the locking member 700 about its longitudinal axis.

Locking arm 710 extends from the cylindrical body 705 to a distal end 717 and having a face 712 and opposite face 711. Locking arm 710 extends perpendicular to the longitudinal axis of the locking member 700 and is off set therefrom. The distal end 717 comprises a catch 720 extending from face 711 away from face 712 and a stabilizing seat 740 extending from face 712 away from face 711. The catch 720 comprises a catch surface 722 and an opposite surface 724 that are parallel and extend from face 711, terminating at catch end 726. The catch 720 also comprises a non-perpendicular corner 728 between catch surface 722 and catch end 726.

The stabilizing seat 740 extends from face 712 in a direction away from the catch 720 and comprises a seat surface 742 and stabilizing surface 744. The seat surface 742 may be a circular surface arranged to accept and contact stabilizing spring 220 and the stabilizing surface 744 may be a raised rounded surface at the center of the stabilizing seat 740. The stabilizing seat 740 is substantially similar to the stabilizing seat 440 described above in connection to FIGS. 5 and 6 and will be understood to be arranged and operate in a substantially similar manner. For example, stabilizing spring 220 may be arranged on seat surface and the establishing surface 744 inserted into the stabilizing spring 220 so to secure the stabilizing spring 220.

As described above, the releasing arm 730 extends in approximately the same direction as the locking arm 710 and comprises a face 737 that is approximately parallel to face 712 of the locking arm 710. The releasing arm 730 comprises a rounded distal end 738 and a release surface 735. The release surface 735 comprises a concave shaped recess 734 extending into the releasing arm.

Figure 8:
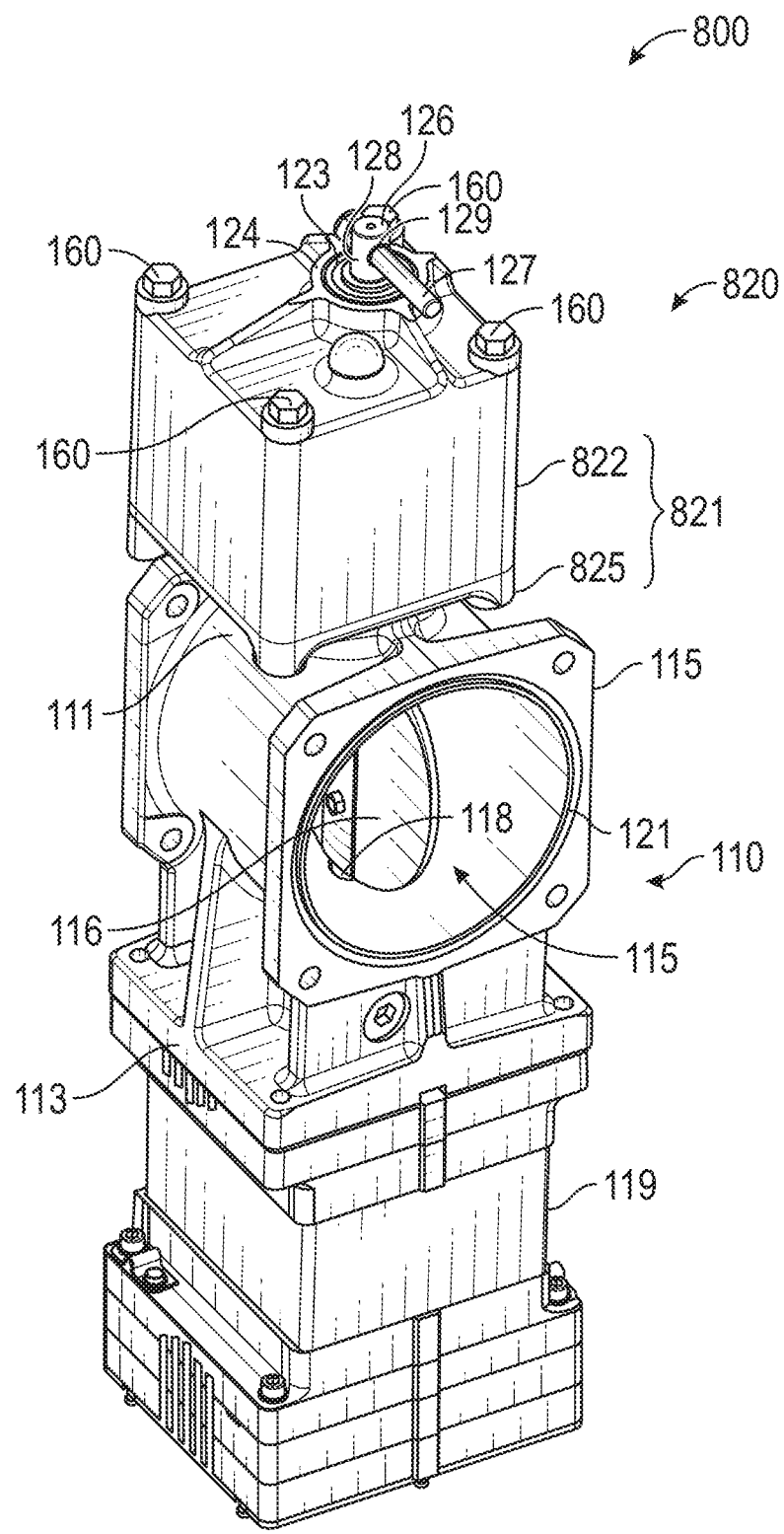
FIG. 8 is a perspective view of another example fluid supply system.

FIG. 8 is a perspective view of an example fluid supply system 800. The fluid supply system 800 may be substantially similar to the fluid supply system 100 of FIG. 1, and the fluid intake system 30 of FIG. 1 may be implemented by fluid supply system 800. Fluid supply system 800 comprises the throttle assembly 110 and a fluid shutoff assembly 820. Fluid shutoff assembly 820 is substantially similar to fluid shutoff assembly 120, except arranged to utilize locking member 700. As described above, fluid shutoff assembly 820 is attached to the throttle assembly 110.

The fluid shutoff assembly 820 comprises a trigger mechanism housing 821 ("housing") and reset handle 127. Similar to housing 121 of FIG. 1, the housing 821 comprises an upper (or first) portion 822 of housing 821 and a bottom (or second) portion 825 of housing 821; however upper portion 822 does not include a port for a releasing mechanism. The housing portions 822 and 825 may be coupled via a bolt, screw thread, snap fit, buckles, adhesive, etc. As illustrated in FIG. 8, the bottom portion 825 may be attached to the top end 111 of the throttle assembly 110. Housing 821 also includes opening 124 having trigger shaft 128 extending from within the housing 821 and through opening 124. Bearing 123 (or bushing) may be provided within the opening 124 about trigger shaft 128.

While FIG. 8 illustrates the fluid shutoff assembly 820 as a separately housed assembly attached to the top end 111 of the housing 115, other configurations are possible within the scope of the present disclosure.

Figure 9:
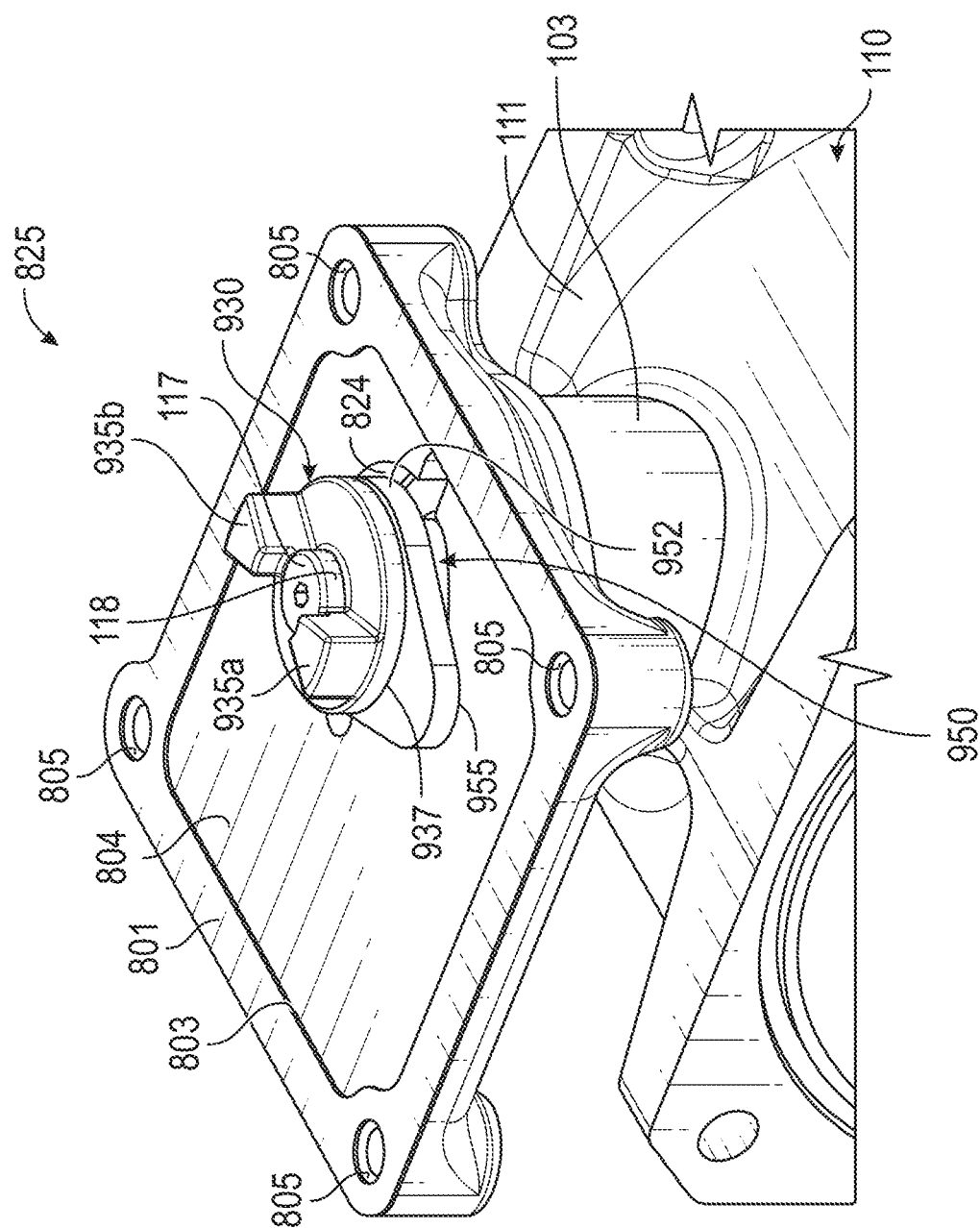
FIG. 9 is a perspective view of a lower portion of an example fluid shutoff assembly included in the fluid supply system of FIG. 8 with the upper portion.

FIG. 9 is a perspective view of the lower portion of the fluid shutoff assembly 820 with the upper portion removed. As shown in FIG. 9, top end 111 of throttle assembly 110 comprises a port 103 to which bottom portion 825 is attached. The upper portion 822 and rest of the fluid shutoff assembly is removed from FIG. 8 for illustrative purposes. Bottom portion 825 comprises wall 803 and surface 801 forming a cavity 804. At the base of cavity 804 and aligned with port 103 is an opening 824. FIG. 9 also depicts a first coupling hub 930 fixedly attached to end 117 of operating shaft 118 and comprises a plurality of teeth 935a,b (collectively "teeth 935"). Coupling hub 930 may be substantially similar to coupling hub 230 described above, except illustratively shown comprising two teeth; however, as described in connection to coupling hub 230, coupling hub 930 may have three or any number of teeth. Coupling hub 930 may operate in a manner substantially similar to coupling 230. As illustrated in FIG. 9, coupling hub 930 is shown extending out of opening 824 with a cylindrical base within opening 824, which is shaped to accept the cylindrical base.

FIG. 9 also illustrates the fluid shutoff assembly 820 comprises a releasing mechanism 950 (referred to herein as "release cam 950") attached to the operating shaft 118 and positioned between the bottom portion 825 of housing 821 and coupling hub 930. Release cam 950 comprises a lobe lift 955 protruding from a base cam 952 in a direction perpendicular to the longitudinal axis of the operating shaft 118. The release cam 950 may be positioned adjacent to the coupling hub 930. For example, the base cam 952 may be in contact with surface 937 of the coupling hub 930 opposite the teeth 935 and shaped to match a circumference of the coupling hub 930. The release cam 950 also has a longitudinal axis aligned with the longitudinal axis of the operating shaft 118.

Figure 10:
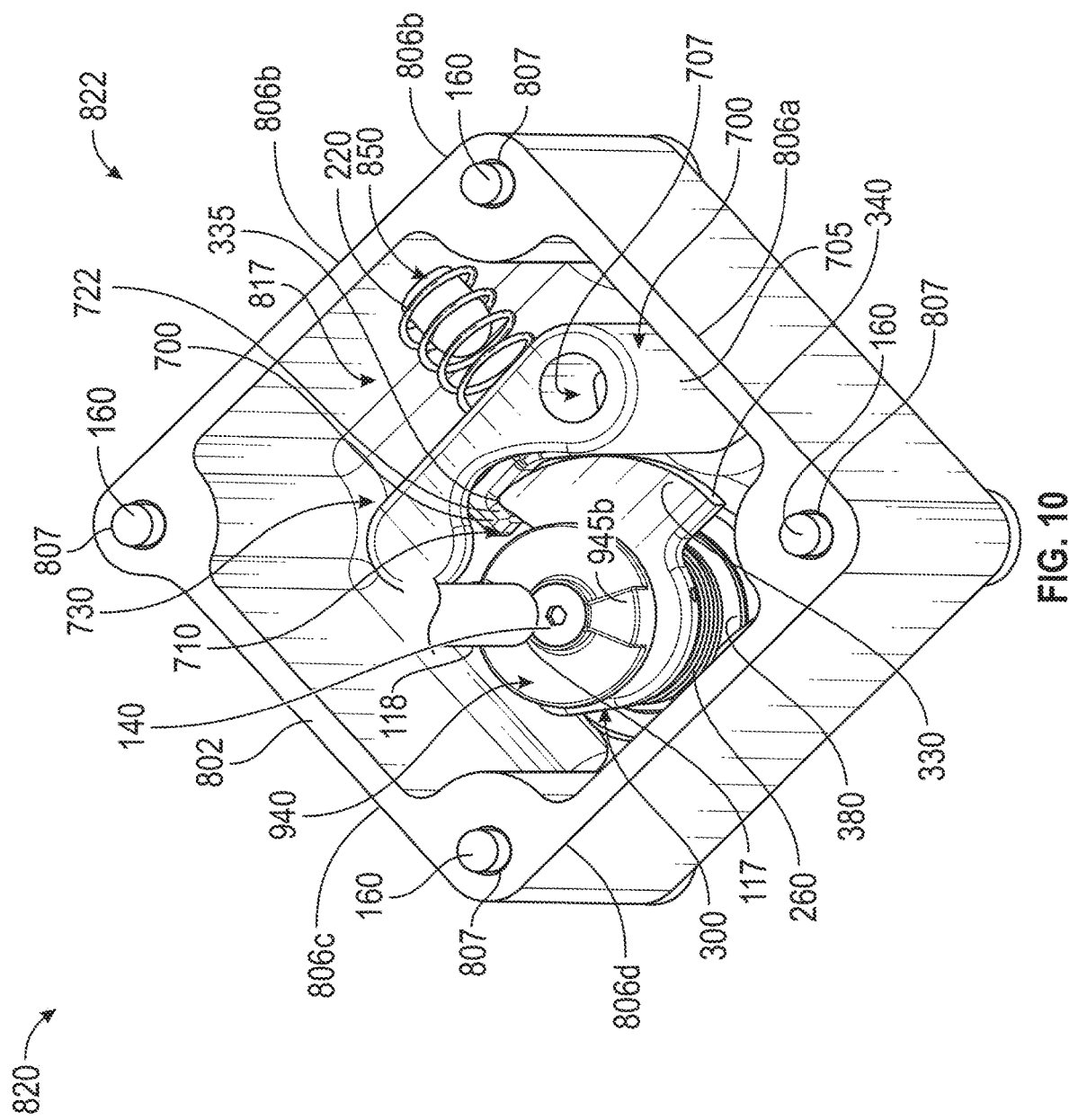
FIG. 10 is a perspective view of an upper portion of the fluid shutoff assembly included in the fluid supply system of FIG. 8 flipped approximately 180 degrees with the lower portion removed.

FIG. 10 is a perspective view of the upper portion of the fluid shutoff assembly 820 within the upper portion 822 of housing 821 with the bottom portion 825 of the housing and the rest of the fluid shutoff assembly removed for illustrative purposes. The fluid shutoff assembly 820 shown in FIG. 10 is flipped approximately 180 degrees from the orientation illustrated in FIG. 8. FIG. 10 also depicts a partial view of shaft 118 having end 117 with the coupling hub 930 removed for illustrative purposes only.

Fluid shutoff assembly 820 comprises trigger shaft 128, bearing 123, stabilizing spring 220, torsion spring 260, and latch 300, each of which may be arranged and operational in a manner similar to that previously described. Fluid shutoff assembly 820 also comprises locking member 700 and a coupling hub 940. As described above, the trigger shaft 128 has a longitudinal axis that is aligned with the longitudinal axis of operating shaft 118, forming a common axis. The latch 300 and torsion spring 260 (sometimes collectively referred to herein as "biasing member") are included in the fluid shutoff assembly 820 and are substantially similar to the latch 300 and spring 260 described above. Thrust washer 380 may also be provided between the housing 821 and torsion spring 260.

Similar to coupling hub 240 described above, coupling hub 940 is attached to end 140 of trigger shaft 128. Coupling hub 940 may be substantially similar to coupling hub 240, except illustratively shown comprising two teeth. Coupling hub 940 may operate in a manner substantially similar to coupling 240.

FIG. 10 illustrates upper portion 822 of housing 821 comprising a walls 806a-d and surface 802 forming a cavity 817. At the top of cavity 817 is opening 124 and bearing 123. Surface 801 and surface 802 are shaped so to match (e.g., via bolt holes 805 with bolt holes 807) forming an enclosure comprising cavities 804 and 817 and enclosing the various components of the fluid shutoff assembly 820. As with housing 121, while housing 821 is described as enclosing the various components of the fluid shutoff assembly 820 and is shown as completely and fully surrounding the components, this need not be the case and housing 821 may partially surround the components as desired for any design requirements.

The locking member 700 is spaced apart from the trigger shaft 128 and attached to upper portion 822 of housing 821. For example, locking member 700 may be attached to housing 821 using a bolt 255 and washer 250 via through hole 707. The locking arm 710 and releasing arm 730 extend from the cylindrical body 705 toward the wall 806c. The stabilizing seat 740 extends from face 712 toward wall 806b and wall 806b comprises a similar but opposite stabilizing surface 850. The stabilizing spring 220 is positioned between stabilizing seat 740 and stabilizing surface 850 and held in a compressed state between face 812 of locking member 700 and wall 806b. This configuration may assist in pushing the locking member 700 using stabilizing force to maintain an inactivated or locked position.

As illustrated in FIG. 10, locking member 700 is in contact with the latch 300, such that the latch 300 applies a pushing force to locking member 700 based on a wound state of torsion spring 260. For example, similar to the embodiment described above in FIGS. 2-6, the locking fillet end 335 is positioned in contact with catch surface 722 of locking member 700. The locking fillet end 335 may be in contact with face 711 alone or in combination with catch surface 722. Thus, based on a torsion force applied to latch 300, a locking force is applied to the locking member 700 at the catch surface 722. As such, the fluid shutoff assembly 820, and thus trigger shaft 128, is restrained in a locked position or first position.

Figure 11:
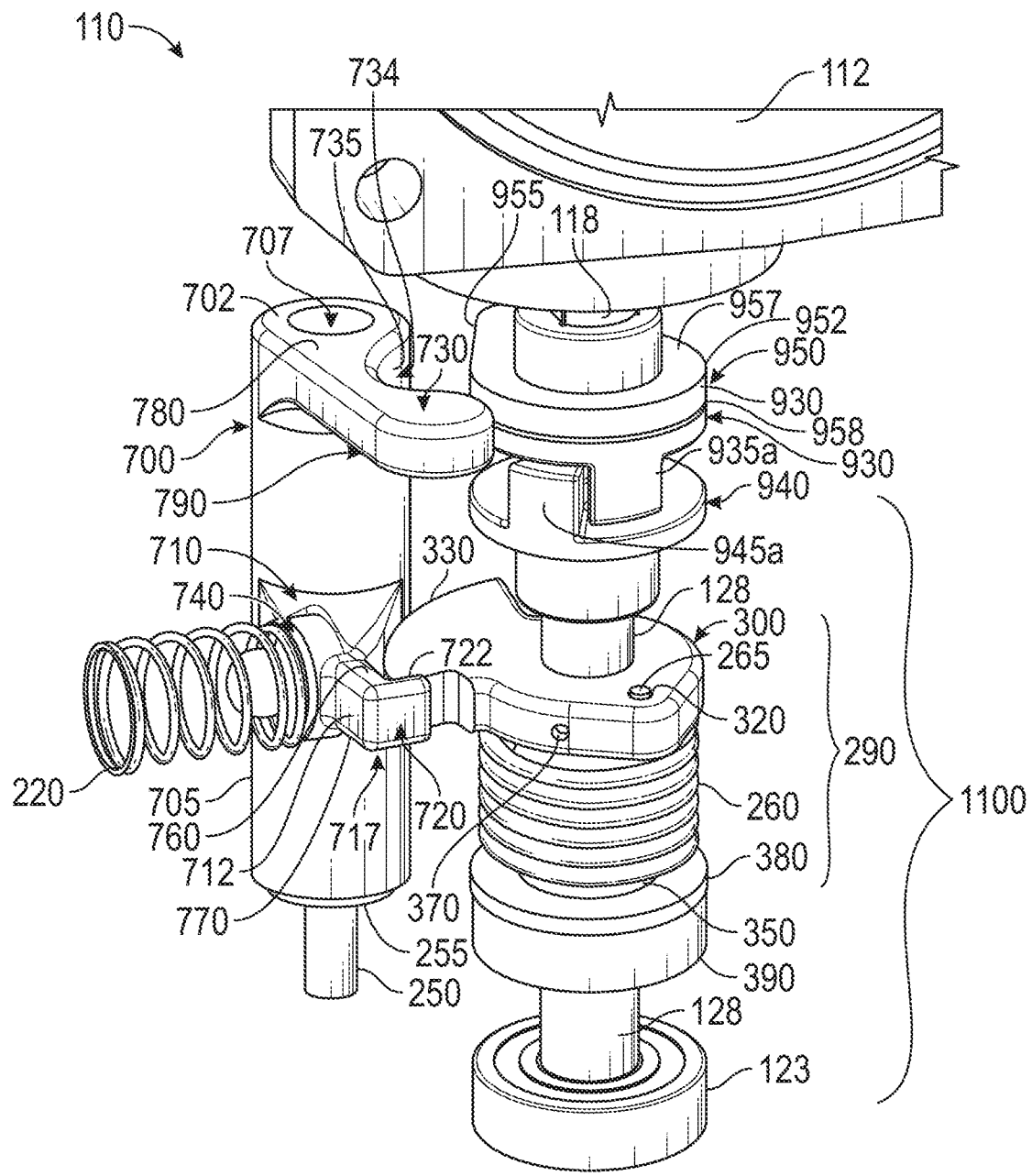
FIG. 11 is a perspective view of the fluid shutoff assembly included in the fluid supply system of FIG. 8 with the housing removed.

FIG. 11 is another perspective view of the fluid shutoff assembly 820 with housing 821 removed for illustrative purposes. As with FIG. 5, the orientation of FIG. 11 is flipped approximately 180 degrees relative to the orientation of FIG. 8. FIG. 11 illustrates throttle assembly 110 and inlet 112. FIG. 11 also depicts a trigger mechanism 1100 of fluid shutoff assembly 820, which comprises the release cam 950, the first coupling hub 930 attached to end 117 of operating shaft 118, second coupling hub 940 attached to end 140 of trigger shaft 128, trigger shaft 128, and biasing member 290, each sharing a common axis aligned with the longitudinal axis of the trigger shaft 128. As described previously, the biasing member 290 comprises the latch 300 and the torsion spring 260. Coupling hub 930 and coupling hub 940 (collectively "a coupler") are arranged to interface with each other in a manner substantially similar to the coupling hub 230 and coupling hub 240.

The trigger mechanism 1100 also comprises the locking member 700. The longitudinal axis of the locking member 700 is parallel to the longitudinal axis of the trigger shaft 128 and spaced apart from each other. The locking arm 710 is aligned with the latch 300, such that the surface 305 and opposite surface of the latch 300 are parallel to a top surface 760 and a bottom surface 770 of the locking arm 710. Additionally, the surface 305, the surface opposite surface 305 of latch 300, or both surfaces may be aligned at either the approximate same longitudinal position as top surface 760 and/or bottom surface 770 or between the top surface 760 and bottom surface 770 along the longitudinal axis of the trigger shaft 128. Thus, biasing member 290 may be in contact with the locking member 700, as described above, and based, on torsion, a locking force is applied to the locking member 700 that locks the trigger mechanism 1100 in the illustrated position.

Similarly, the releasing arm 730 is aligned with the latch releasing cam 950, such that the surface 957 and opposite surface 958 of the releasing cam 950 are parallel to a top surface 780 and a bottom surface 790 of the releasing arm 730. Additionally, the surface 957, the surface 958, or both surfaces may be aligned at either the approximate same longitudinal position as top surface 780 and/or bottom surface 790 or between the top surface 780 and bottom surface 790 along the longitudinal axis of the trigger shaft 128.

INDUSTRIAL APPLICABILITY

In certain situations it may be desirable to arrange a fluid shutoff assembly near and/or in series with a throttle. A throttle may be utilized to increase and/or decrease power from the engine based on managing fluid flow through fluid channel by constriction or obstruction of the channel, for example, by using a valve member. Thus, the throttle impacts power from the engine by regulating the amount of fuel, air, or mixture thereof entering the engine. However, with reference to FIG. 1, packaging constraints within the physical area for system 10 may restrict such placement. Thus, embodiments herein describe using a throttle valve member opposed to a stand-alone fluid shutoff valve in series with the throttle assembly and controlled by the fluid shutoff assembly 34. By merging and/or integrating the fluid shutoff assembly into the throttle valve member, packaging constraints may be minimized and real estate within the engine bay can be significantly improved. Whereas, conventional fluid supply systems utilize standalone shut off valves that require additional space, separate from the throttle valve member.

Accordingly, valve member 116 of throttle assembly 110 can be utilized as valve member 32 a fluid supply system 100 (or 800) implemented as the fluid intake system 30. When system 10 is operating under normal conditions the throttle assembly will operate normally and the valve member (e.g., valve member 116) will be operated by a position controller (e.g., position controller 119) to permit fluid intake. However, upon identifying a trigger event by the CPU 40 based on detection signals from sensors 50, the CPU 40 communicates a control signal to the fluid supply system to control the supply of fluid to the engine 12. That is, the control signal may cause a trigger mechanism (e.g., trigger mechanism 200 or 1100) in the fluid supply system to activate, couple the trigger mechanism to an operating shaft of the throttle assembly, and apply a torque to the operating shaft which causes the throttle valve member to rotate to a fully closed position. In some embodiments, the position controller may operate the valve member to close, and the trigger mechanism may assist the position controller to close and hold the valve member in the fully closed position.

The fluid shutoff assembly 34 can be positioned co-axially with the operating shaft of the valve member 32. The fluid shutoff assembly 34 can then be decoupled from the throttle valve member 32 during throttle conditions via the trigger mechanism, such that the throttle valve member 32 may operate independently of the trigger shaft. For example, valve member 32 may be biased between a full open during full throttle conditions and an idle position during low throttle conditions. In some implementations, the valve member 32 may be biased to a closed position, and, upon detecting a trigger event, the fluid shutoff assembly 34 engages with the operating shaft of the throttle valve member 32 to bias and hold the valve member 32 to a full closed position, thereby shutting off fluid flow to the engine 12. Without the trigger mechanism, the valve member 32 may dither and/or electrical energy that attempts to close the valve member 32 may fail and the valve member 32 may not be held in a fully closed position, thus permitting undesirable fluid intake during an emergency situation. Thus, embodiments herein provide for a fluid shutoff assembly 34 that permit movement of valve member 32 independent of the fluid shutoff assembly 34 during normal operation and, during a trigger event, couples the fluid shutoff assembly 34 to the valve member 32 to fully close the valve member 32 and maintain a fully closed position.

Figure 12:
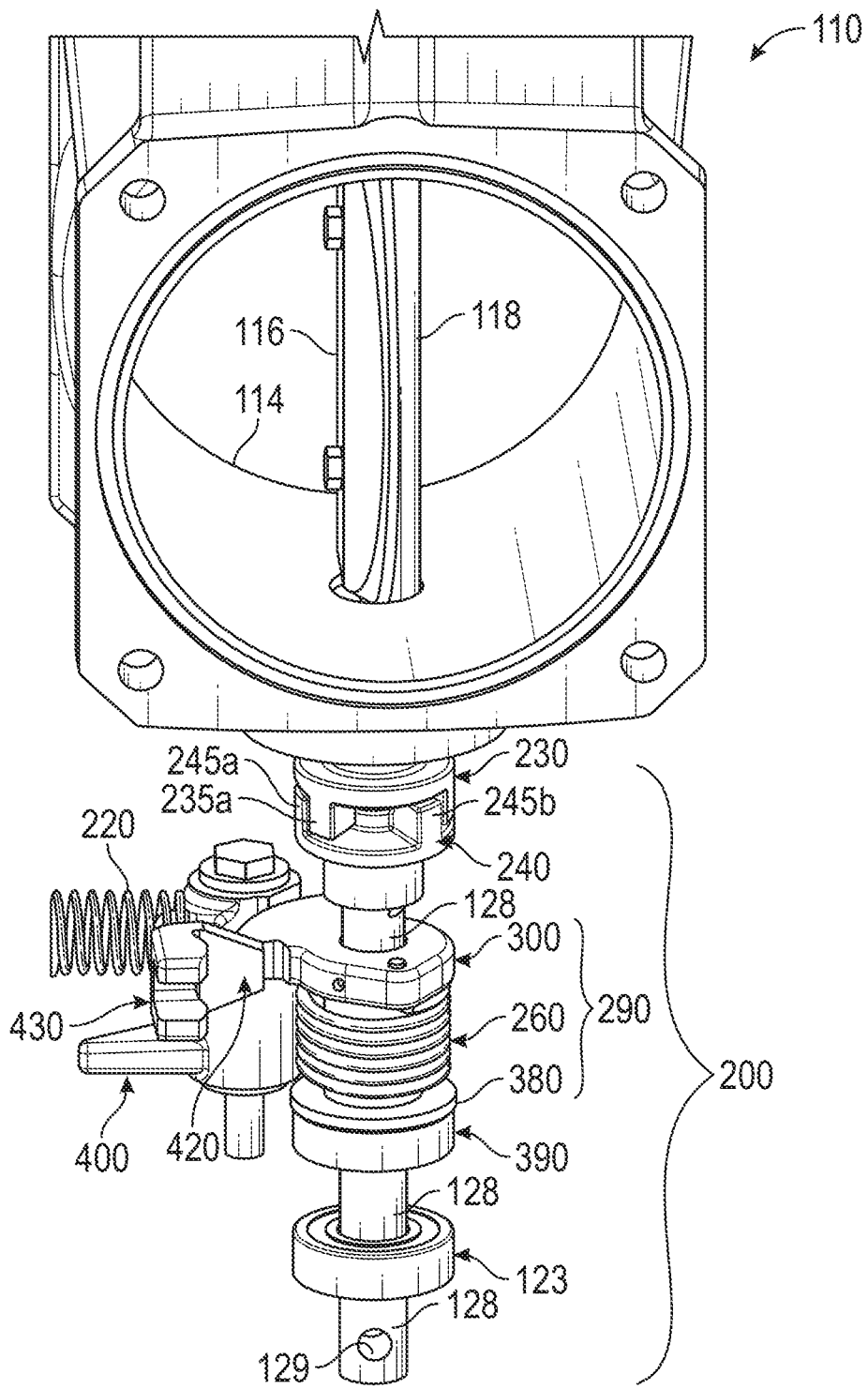
FIGS. 12-14 are perspective views illustrating example operation states of the fluid supply system of FIG. 2 with the housing removed and inverted with respect to fluid supply system of FIG. 2.
Figure 13:
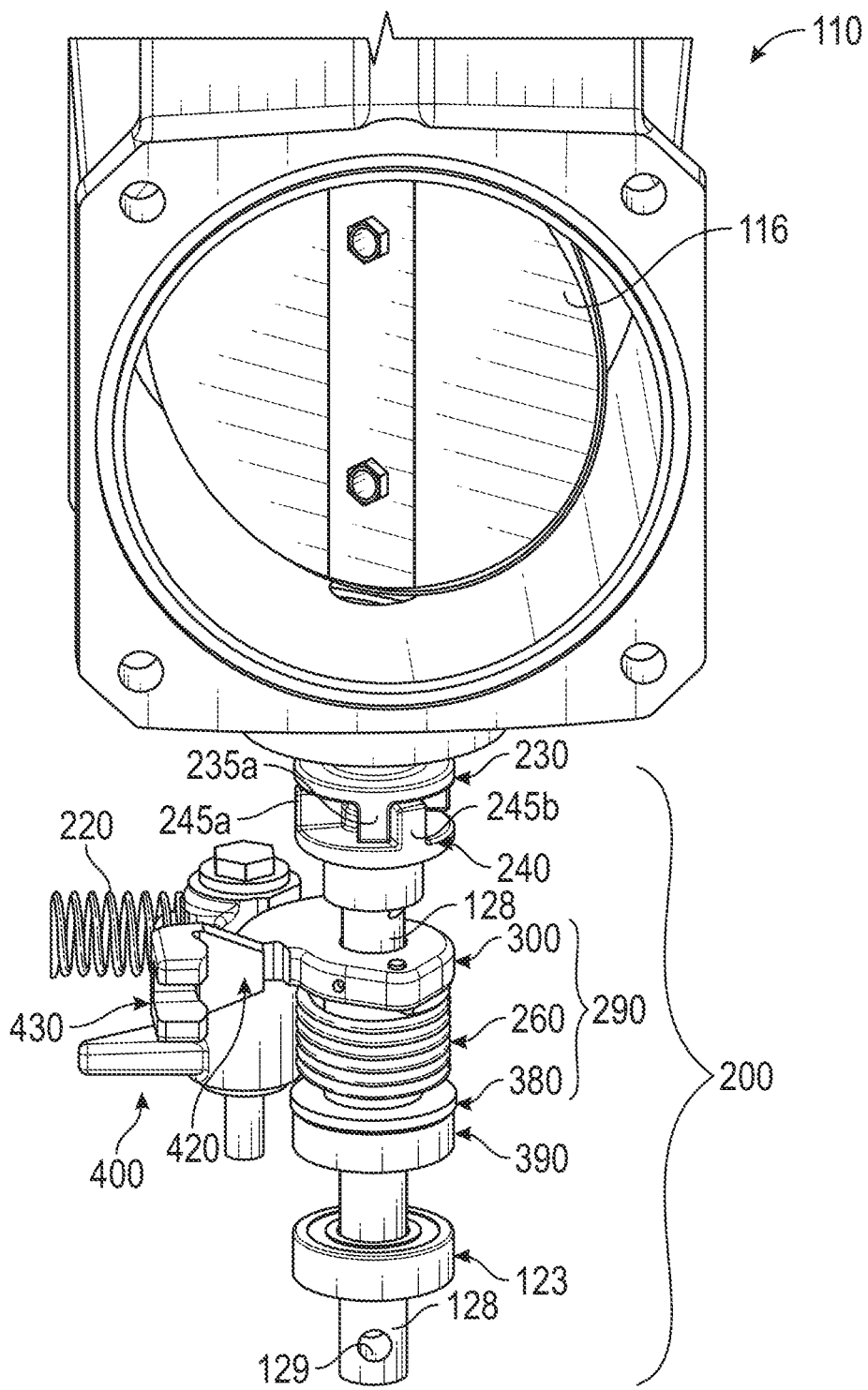
Figure 14:
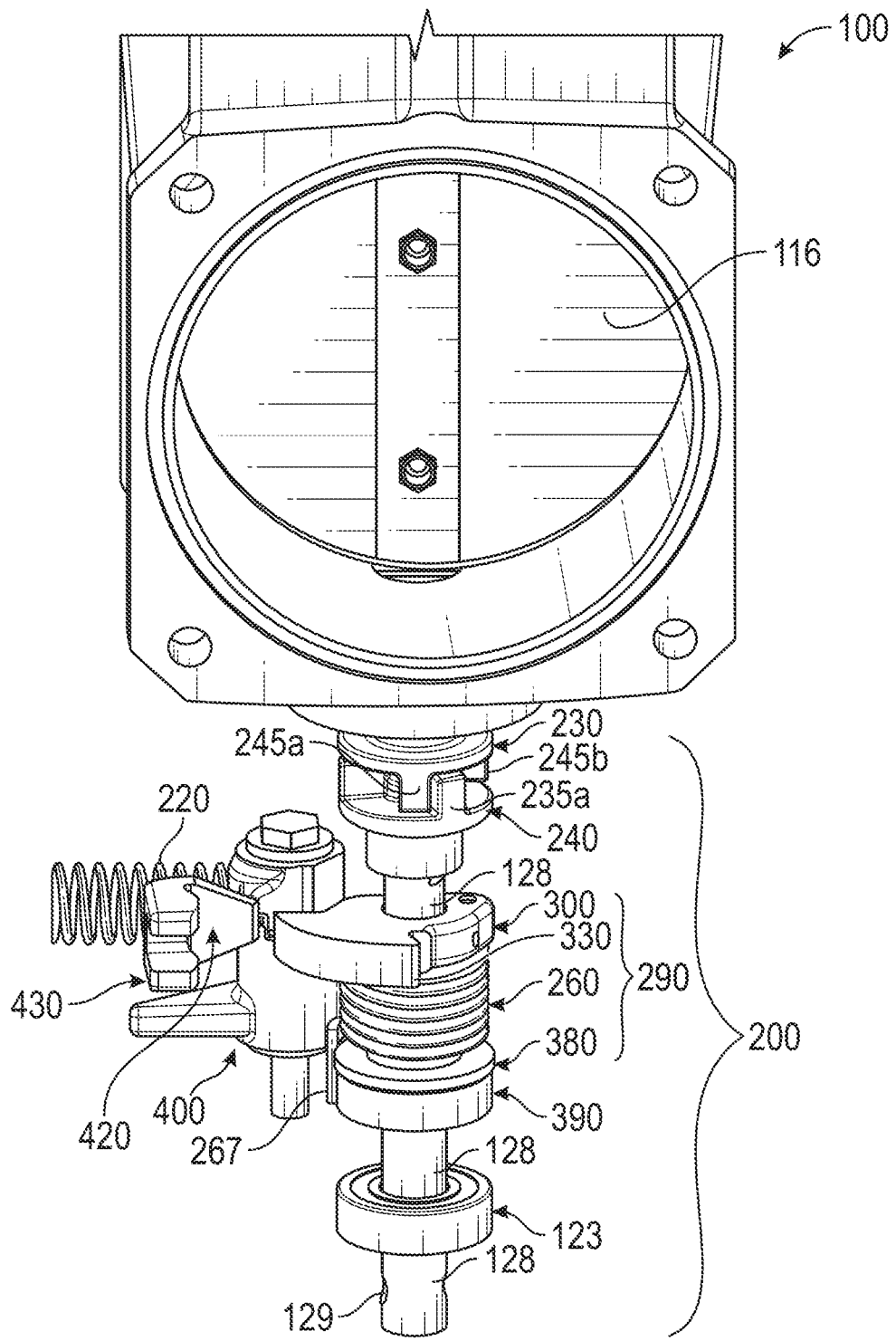

FIGS. 12-14 are perspective views illustrating example operation states of the fluid supply system of FIG. 2 with the housing removed and inverted with respect to fluid supply system of FIG. 2. FIGS. 12-14 illustrate an example operation of the fluid shutoff assembly 120 having a trigger mechanism 200. FIG. 12 illustrates the trigger mechanism 200 in an untriggered state (sometimes referred to herein as a "locked position"), such as illustrated in FIGS. 4-6, with the valve member 116 in a full open position. FIG. 13 illustrates the trigger mechanism 200 in an untriggered state with the valve member 116 in an idle position. FIG. 14 illustrates the trigger mechanism 200 in a triggered state (sometimes referred to herein as a "released position") with the valve member 116 in a full closed position. While FIGS. 12-14 do not depict the releasing mechanism 130, it will be understood that this is for illustrative purposes only and the releasing mechanism 130 may be arranged as illustrated in FIGS. 4-6 above.

During normal operation, coupling hubs 230, 240 are arranged to decouple the fluid shutoff assembly 120 from the throttle assembly 110. Thus, the valve member 116 is decoupled from the trigger mechanism 200, by, for example, decoupling the shafts 118 and 128 (e.g., end 140 and end 117 are adjacent and decoupled from each other). Rotational movement of the operating shaft by the position controller 119 of FIG. 2 is not transferred to the trigger shaft 128, and the valve member 116 may be move independent of the trigger shaft 128. Teeth 235 are arranged to interface with teeth 245 thereby permitting the valve member 116 to freely rotate between a full open position and an idle position while the trigger mechanism 200 is in the locked position. For example, the coupling hub 230 may be rotated from a first position corresponding to valve member 116 in full open position to a second position corresponding to valve member 116 in idle position. In the illustrative embodiment, such movement may include rotational movement of tooth 235a from a position adjacent to tooth 245a to adjacent to tooth 245b (as illustrated in FIGS. 12 and 13). The coupling hub 245 may be stationary in locked position. In various embodiments, the locked position may permit up to approximately 60 degrees of uninhibited rotational movement such that idle position of valve member 116 may be approximately 60 degrees from full open. Tooth 235a may thus travel radially approximately 60 degrees between tooth 245a and 245b. Breathing room based on the number of teeth 235, 245 of the coupling hubs may be provided that each tooth may dither from a desired position. For example, the position controller 119 may actuate the valve member 116 for 75 degrees of travel. At full throttle, the valve member 116 may not be completely parallel to the fluid flow, but instead 7 degrees from parallel. Normal operation of the valve member 116 may be anywhere from 7 degrees to 63.25 degrees from parallel to fluid flow, e.g., from full throttle to idle. That is, normal operation of the valve member 116 may have approximately 56.25 degrees of total movement. Where coupling hubs 230, 240 are utilized having two teeth, the coupling teeth 235, 245 have approximately 88 degrees of travel from contact there between in one direction until contact in the opposite direction. So, there may be approximately 16 degrees of breathing room on either end of the rotation before contact between teeth 235 and 245 is made (e.g., (88-56)/2). Where coupling hubs 230 and 240 have three teeth, the breath rom may be approximately five degrees.

The position of valve member 116 may be controlled by the position controller 119 to achieve a desired power output from engine 12 under normal operating conditions. For example, the position controller 119 may receive speed control commands from CPU 40. The speed control command may correspond to a desired power output from engine 12 and a valve member position. Based on the speed control commands, the position controller 119 may operate actuators therein to act on the operating shaft 118 and move the valve member 116 to a desired valve member position for the desired amount of power output from engine.

In the untriggered state illustrated in FIGS. 12 and 13, the trigger mechanism 200 holds a buildup of potential energy while the fluid shutoff assembly 120 is decoupled from the throttle assembly 110. For example, biasing member 290 may be in a locked position based on contact with the locking member 400. The locking fillet end 335 of latch 300 may be near or otherwise in contact with catch surface 422 of the locking member 400. The catch surface 422 may hold the latch 300 in place causing the buildup of potential energy within the trigger mechanism 200, for example, by holding the torsion spring 260 in a wound state. That is, the latch 300 torques the end 265 of the torsion spring via through hole 320 such that the torsion spring 260 is restrained in a wound condition and the trigger mechanism 200 holds the resulting potential energy. Based on the torsion force applied to latch 300 by the torsion spring 260, a locking force is applied to the locking member 400 at the catch surface 422, which applies a torque that locks the trigger mechanism 200 in the illustrated position.

FIG. 13 illustrates valve member 116 operated in an idle position (e.g., 60 degree from full open) during normal operation. The trigger mechanism 200 remains decoupled from the throttle assembly and the arrangement of the trigger mechanism is substantially unchanged from FIG. 12. However, tooth 235a has radially shifted to tooth 245b due to the position controller 119 rotation of operating shaft 118.

Upon detection of a trigger event, system 10 via CPU 40 controls the releasing mechanism 130 to activate the trigger mechanism 200 such that the trigger shaft 128 is coupled to the operating shaft 118, as illustrated in FIG. 14. Through coupling the trigger and operating shafts 128, 118, the trigger shaft 128 may induce a rotational movement into the operating shaft 118 that results in the valve member 116 moving to and/or being held in a full closed position.

For example, when the trigger event is detected, CPU 40 may command the releasing mechanism 130 to retract solenoid 134 and head 136. The head 136 applies a releasing force to the front surfaces 436a, 436b and pulls the seat 430 away from the latch 300. The releasing force pulls the distal end 417 of the locking member 400 and causes the locking member 400 to rotate about its longitudinal axis overcoming the stabilizing force of the stabilizing spring 220. In some embodiments, the front surfaces 436a, 436b may have a convex or rounded contoured surface that, along with space provided by through hole 432, is arranged so that the head 136 stays on its center as it is retracted. That is, as the head 136 is retracted, the contour of the surfaces 436a, 463b and the through hole 432 allow for some movement of the head 136 relative to the distal end 417 within the through hole 432, such that the solenoid 134 is retraced along its longitudinal axis and does not dither from this center.

Once the stabilizing force is overcome, the distal end 417 of the locking member 400 catch surface 422 is moved relative to the locking fillet end 335 of latch 300. When the locking fillet end 335 reaches the non-perpendicular corner 428, a portion of the potential energy held in the trigger mechanism 200 is released as the locking fillet end 335 passes by the non-perpendicular corner 428 and disengages from the catch surface 422. The non-perpendicular corner 428 may facilitate avoidance of freezing at a sharp corner such that a buildup of force within the trigger mechanism 200 is unable to be overcome.

Once the latch 300 is released, the torsion spring 260 releases the built up potential energy as kinetic energy in returning to a released or resting state of the torsion spring 260. Rotation of the torsion spring 260 results in a rotational movement of the latch 300 and the trigger shaft 128 about the longitudinal axis of the trigger shaft 128. Rotation of the trigger shaft 128 causes the coupling hub 240 to rotate relative to coupling hub 230 and until the coupling hubs 230, 240 engage and couples the trigger shaft 128 to the operating shaft 118. For example, tooth 245a rotates to apply a rotational force against tooth 235a, which couples the shafts 118 and 128 together. The rotational force applied to the trigger shaft 128 is then transferred to the operating shaft 118, and a torque is applied to the valve member 116. The torque may rotate the valve member 116 to a full closed position as shown in FIG. 14.

In some embodiments, the system may also control the position controller 119 to close the valve member 116 due to a trigger event and at the same time activate the trigger mechanism 200. Releasing the potential energy build up within the torsion spring 260 can add an incremental torque to the valve member 116 via coupling the trigger shaft 128 to operating shaft 118, which may assist in holding the valve member 116 shut. Thus, regardless as to whether the electrical energy to the position controller 119 is present or not (e.g., an electrical failure occurs), the valve member 116 can be kept in a closed position. Similarly, any dithering induced into the valve member 116 may be isolated due to the additional torque applied by the trigger mechanism 200.

To reset the fluid shutoff assembly 120, the trigger shaft 128 may be rotated in a direction opposite to the rotation for coupling the shafts 118 and 128. For example, the reset handle 127 may be operated manually to turn the coupled shafts. In some embodiments, the reset may be automated. Turning the trigger shaft 128 causes the latch 300 to rotate and the catch 420 to drag the cam lobe 330 and apply a force to the surface 424, which pushes the locking member 400 further away from the trigger shaft 128 and applies a compression force onto stabilizing spring 220. When the catch 420 reaches the reset lobe lift 340, the locking member 400 cams and the stabilizing spring 220 releases built up potential energy as kinetic energy in the form of a translational force applied to the locking arm 410. The latch 300 and the locking member 400 then rotate back to their respective locked positions and the locking fillet end 335 contacts the catch 420. When contact occurs, locking member 400 applies a compression force to the stabilizing spring 220 via locking arm 410 such that the trigger mechanism 200 returns to an untriggered and locked position.

Figure 15:
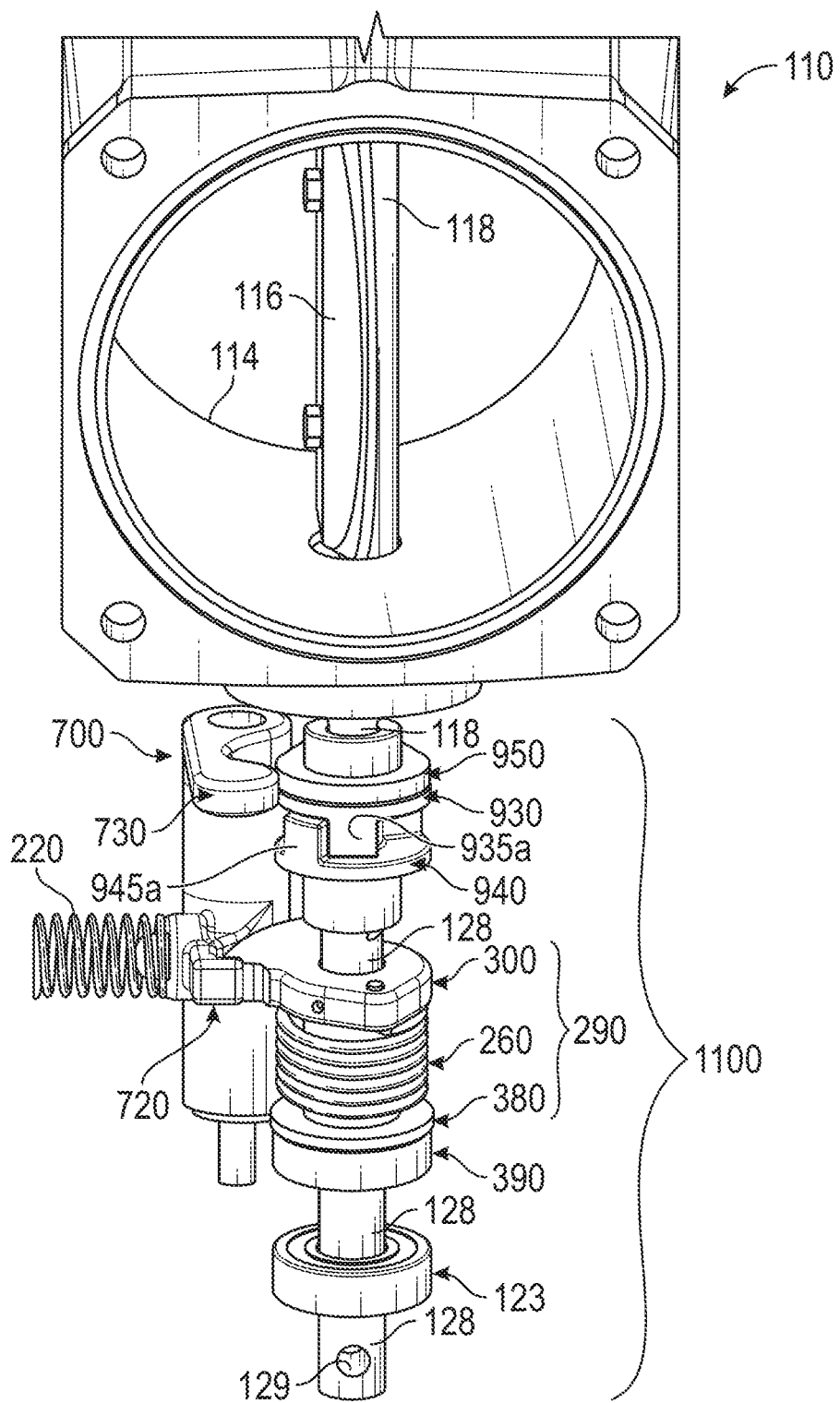
FIGS. 15-17 are perspective views illustrating example operation states of the fluid supply system of FIG. 8 with the housing removed and inverted with respect to fluid supply system of FIG. 8 and the housing removed.
Figure 16:
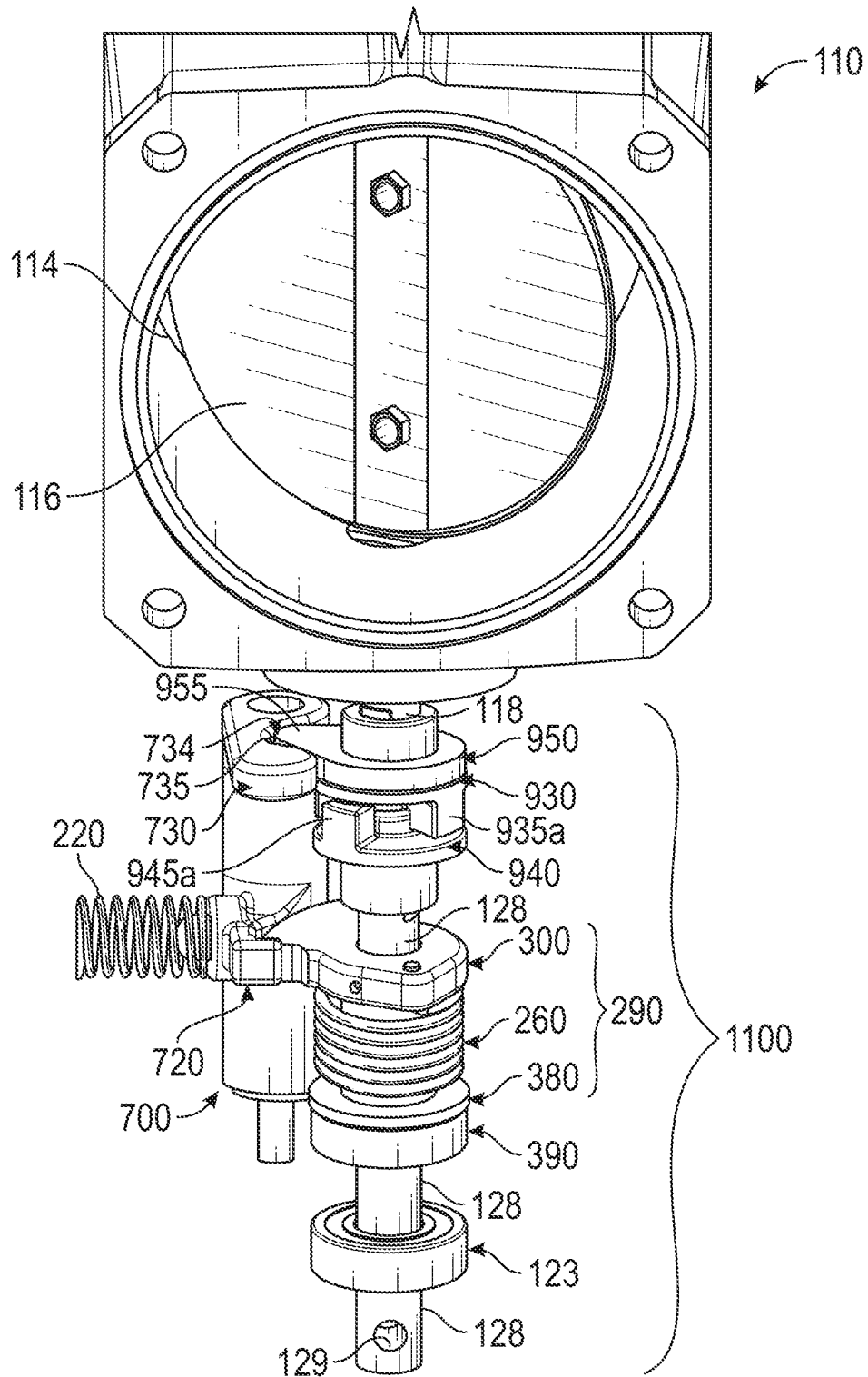
Figure 17:
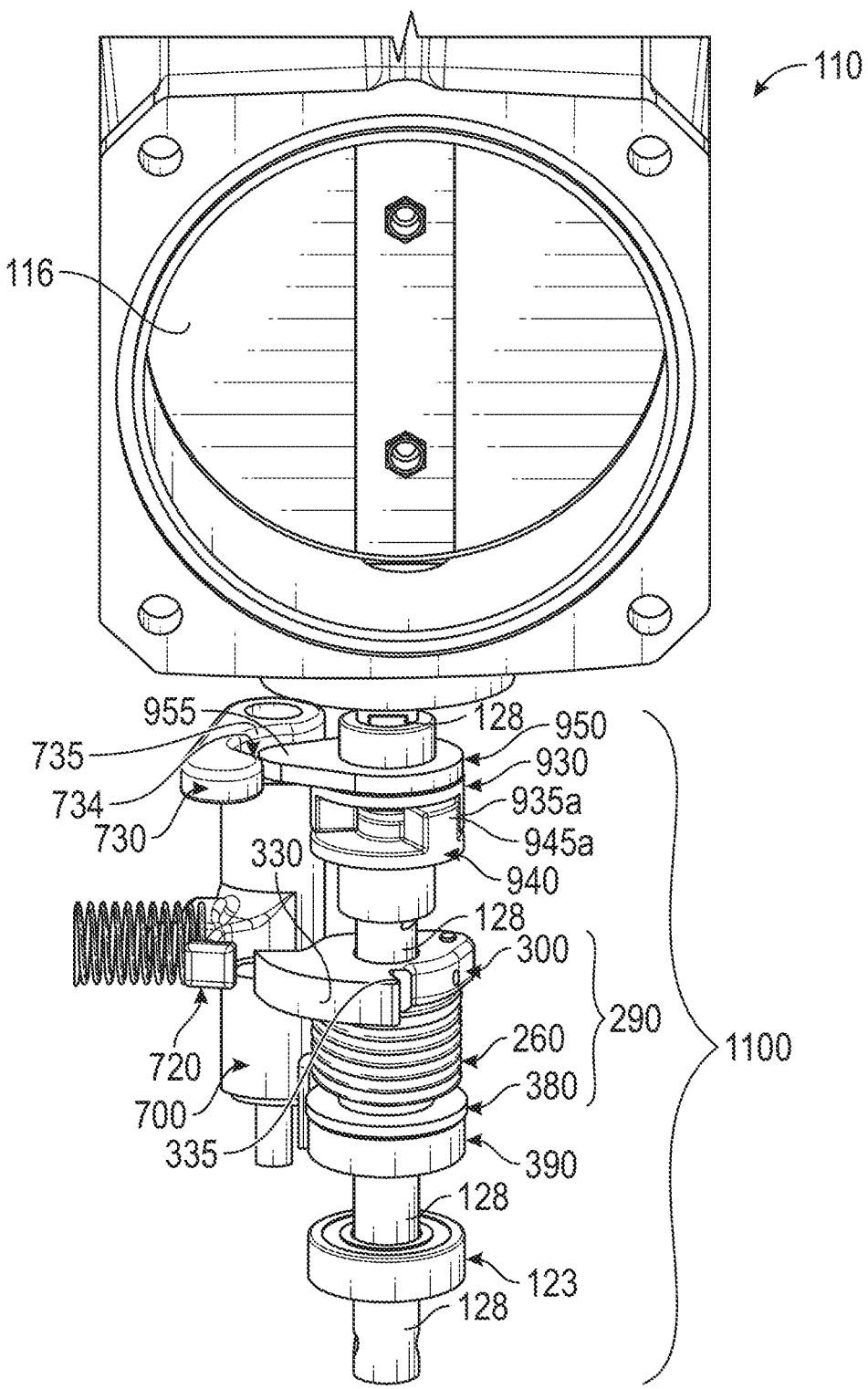

FIGS. 15-17 are perspective views illustrating example operation states of the fluid supply system of FIG. 8 with the housing removed and inverted with respect to fluid supply system of FIG. 8. FIGS. 15-17 illustrate an example operation of the fluid shutoff assembly 820 having locking member 700 in place of locking member 400. FIG. 15 illustrates the trigger mechanism 1100 in the locked position, such as illustrated in FIGS. 9-11, with the valve member 116 in the full open position. FIG. 16 illustrates the trigger mechanism 1100 in an untriggered state with the valve member 116 in the idle position. FIG. 17 illustrates the trigger mechanism 1100 in the released position with the valve member 116 in a full closed position. The fluid shutoff assembly 820 operates in a substantially similar manner to the trigger fluid shutoff assembly 120, except that releasing mechanism 130 is not utilized and locking member 400 is replaced with locking member 700.

As explained above in connection to FIGS. 12 and 13, during normal operation the coupling hubs 930, 940 are arranged to decoupled the fluid shutoff assembly 820 from the throttle assembly 110 and the operating shaft 118 and trigger shaft 128 may be operated independently. Rotational movement of the operating shaft 118 is not transferred to the trigger shaft 128, and the valve member 116 may move independent of the trigger shaft 128. Teeth 935 are arranged to interface with teeth 945 thereby permitting the valve member 116 to freely rotate between full open and idle positions while the trigger mechanism 1100 is in the locked position. For example, when the valve member 116 is rotated to the full open position, tooth 935a is nearest to tooth 945a. In some embodiments, there may be approximately 5 degrees of breathing room between teeth 935 and 945 while in the full open position of FIG. 15.

In the locked position illustrated in FIGS. 15 and 16, the trigger mechanism 1100 holds a buildup of potential energy while the fluid shutoff assembly 820 is decoupled from the throttle assembly 110. For example, biasing member 290 may be in a locked position based on contact with the locking member 700 based on the locking fillet end 335 contacting catch surface 722. The catch surface 722 may hold the latch 300 in place causing the buildup of potential energy within the trigger mechanism 1100, for example, by holding the torsion spring 260 in a wound state. Based on the torsion force applied to latch 300 by the torsion spring 260, a locking force is applied to the locking member 700 at the catch surface 722, which applies a torque that locks the trigger mechanism 200.

FIG. 16 illustrates valve member 116 operated in an idle position (e.g., 60 degree from full open) during normal operation. The fluid shutoff assembly 820 remains decoupled from the throttle assembly 110 and the locking mechanism is in the locked position. Tooth 935a of coupling hub 930 has radially shifted away from tooth 945a due to the position controller 119 rotation of operating shaft 118. In some embodiments, there may be approximately 25 degrees of breathing room between coupling hub 930 and coupling hub 940, which may facilitate operation of the release cam 950. For example, in the case of two teeth coupling hubs 930, 940, the teeth 935, 945 may be approximately pie shaped having up to about 46 degrees between of the circular rotation between edges of a given tooth. That is, the four teeth 935 and 945 of coupling hubs 930 and 940 take up 184 degrees of the circle of rotation, leaving approximately 88 degrees for rotation from teeth 935, 945 contacting in one direction until they contact in the other. For 60 degrees of rotation for normal throttle operation, that leaves 28 degrees of extra breathing room or extra travel available. However, the trigger event is to occur at a smaller angle after exceeding the normal range of motion. Since rotation of the trigger shaft 118 triggers the event in this embodiment, the trigger event is limited by the range of rotation, e.g., 75 degrees total. As such, it may be desirably to have only a few degrees between idle rotation and triggering the locking mechanism 1100, not the full 28 degrees of travel available.

Along with rotating the coupling hub 930, rotation of the operating shaft 118 is imparted on the release cam 950, which rotates release cam 950 toward the releasing arm 730 of the locking member 700. As illustrated in FIG. 16, when the operating shaft 118 is operated to idle open position (e.g., 60 degrees from full open), the lobe lift 955 of the release cam 950 enters the recess 734 of the locking member 700. The recess 734 and release surface 735 may be shaped to receive the lobe lift 955 of release cam 950 to activate the trigger mechanism 1100. For example, the release surface 735 may have a first portion having a radius arranged to permit the lobe lift to enter recess 734 uninhibited and a second portion nearer to the distal end 738 of the releasing arm 730 having a radius smaller than the radius of the first portion contacts the lobe lift 955 in response to the lobe lift 955 rotating to or beyond the idle position. Thus, in some embodiments, the lobe lift 955 may initiate contact with the release surface 735 when operating shaft 118 is in the idle position. In another embodiments, the release cam 950 may not be in contact with the locking member 700 until the operating shaft 118 is rotated beyond the idle position.

Upon detection of a trigger event, system 10 via CPU 40 sends control commands to the position controller 119 to rotate the operating shaft 118 beyond the idle position and activate the trigger mechanism 1100, as illustrated in FIG. 17. Through coupling of the trigger and operating shafts 128, 118, the trigger shaft 128 may induce a rotational movement into the operating shaft 118 that results in the valve member 116 moving to and/or being held in a full closed position.

For example, when the trigger event is detected, the control the position controller 119 may rotate the operating shaft 118 beyond the idle position. In some embodiments, the position controller 119 may close the valve member 116. Such rotation of the operating shaft 118 also rotates the release cam 950 such that the lobe lift 955 is moved deeper into recess 734 toward the distal end 738. As the lobe lift 955 contacts the second portion of the release surface 735 and travels out of the recess 734, the lobe lift 955 exerts a releasing force onto the rounded distal end 738 to overcome the stabilizing force exerted by the stabilizing spring 220 as illustrated in FIG. 17. The releasing force causes the releasing arm 730 to torque about the longitudinal axis of locking member 700, which rotates the locking member 700. With the rotation of the locking member 700, the locking arm 710 is rotated in the same direction and away from the biasing member 290. As the locking arm 710 is rotated, the locking fillet end 335 of latch 300 travels across the catch surface 722 until separating therefrom. Once locking fillet end 335 is no longer in contact with catch surface 722, the biasing member 290 is then released triggering the trigger mechanism 1100 to couple the trigger shaft 128 to the operating shaft 118 via coupling hubs 930 and 940, in a manner substantially similar to that described in connection to FIG. 14.

As described above in connection to FIG. 14, to reset the fluid shutoff assembly 820 from the released position, the trigger shaft 128 may be rotated in a direction opposite to the rotation for coupling the shafts 118 and 128. Turning the trigger shaft 128 causes the release cam 950 to rotate and the lobe lift 955 to travel about the distal end 738 of the releasing arm 730. The release cam 950 applies a force to the distal end 738, which rotates the locking member 700 and applies a compression force onto stabilizing spring 220. The latch 300 is then rotated back into the locked position such that locking fillet end 335 contacts catch surface 722.

Although this invention has been shown and described with respect to detailed embodiments and examples thereof, it will be understood by those skilled in the art that various changes in form and detail thereof may be made without departing from the spirit and scope of the claimed invention. Accordingly, the preceding detailed description is merely exemplary in nature and is not intended to limit the invention or the application and uses of the invention. In particular, the described embodiments are not limited to use in conjunction with a particular type of engine. For example, the described embodiments may be applied to generators, engines, machinery, equipment, or any variant thereof. Furthermore, there is no intention to be bound by any theory presented in any preceding section. It is also understood that the illustrations may include exaggerated dimensions and graphical representation to better illustrate the referenced items shown, and are not considered limiting unless expressly stated as such.

It will be understood that the benefits and advantages described above may relate to one embodiment or may relate to several embodiments. It is appreciated that features shown or discussed in one embodiment or example can be combined with other features shown or discussed in other embodiments and examples. The embodiments are not limited to those that solve any or all of the stated problems or those that have any or all of the stated benefits and advantages.

What is claimed is:

1. A fluid supply system for a machine, the fluid supply system comprising:
    a throttle assembly comprising:
        a housing having an inlet, an outlet and a channel therebetween that fluidly connects the inlet and the outlet for supplying a fluid to the machine,
        a valve member disposed within the channel, and
        a first shaft extending across the channel and coupled to the valve member, the first shaft having a first end, a second end opposite the first end, and a first longitudinal axis extending between the first end and the second end, the first shaft being operable to rotate relative to the housing about the first longitudinal axis;
    a position controller coupled to the first shaft proximate the first end and operable to rotate the first shaft relative to the housing, wherein rotation of the first shaft relative to the housing moves the valve member between a plurality of positions within the channel; and
    a fluid shutoff assembly integrated with the throttle assembly, the fluid shutoff assembly comprising:
        a second shaft comprising a third end, a fourth end opposite the third end, and a second longitudinal axis extending between the third end and the fourth end, the second shaft being operable to rotate relative to the housing about the second longitudinal axis, the third end being located adjacent to the second end,
        a biasing member fixedly attached to the second shaft,
        a locking member operable to restrain the second shaft in a first position relative to the housing via engagement with the biasing member, the biasing member applying a biasing force to the locking member when the second shaft is in the first position,
        a releasing mechanism operable to move the locking member relative to the biasing member and release the biasing member from contact with the locking member, wherein the biasing member moves the second shaft to a second position in response to the release, and
        a coupler comprising a first coupling hub fixed in rotation to the second end of the first shaft, and a second coupling hub fixed in rotation to the third end of the second shaft, the first coupling hub being interfaced with the second coupling hub, the first coupling hub and the second coupling hub being operable to
            decouple the second shaft from rotation with the first shaft when the second shaft is in the first position, and
            couple the second shaft in rotation with the first shaft when the second shaft is in the second position.

2. The fluid supply system of claim 1, wherein the first longitudinal axis is coaxial with the second longitudinal axis.

3. The fluid supply system of claim 1, wherein the valve member is held to a closed position and blocks fluid flow from the inlet to the outlet when the first shaft and the second shaft are coupled in rotation.

4. The fluid supply system of claim 1, wherein the biasing member comprises a latch, the latch being coupled to the second shaft between the coupler and the fourth end of the second shaft, the latch having a fillet end in contact with the locking member when the second shaft is in the first position, the latch being disengaged from the locking member when the second shaft is in the second position.

5. The fluid supply system of claim 4, wherein the biasing member further comprises a torsion spring coupled to the latch and wound about the second shaft between the latch and the fourth end of the second shaft.

6. The fluid supply system of claim 1, wherein the first coupling hub comprises a first plurality of teeth and the second coupling hub comprises a second plurality of teeth interfaced with the first plurality of teeth,
    the second plurality of teeth having a first orientation relative to the first plurality of teeth when the second shaft is in the first position,
    the second plurality of teeth having a second orientation relative to the first plurality of teeth when the second shaft is in the second position, wherein the second shaft is coupled in rotation to the first shaft when the second plurality of teeth are in the second orientation.

7. The fluid supply system of claim 1, wherein the locking member comprises a cylindrical body parallel to the first longitudinal axis and a locking arm extending from the cylindrical body in a direction toward the second shaft, wherein the biasing member is engaged with the locking arm when the second shaft is in the first position.

8. The fluid supply system of claim 7, wherein the releasing mechanism comprises an actuator having a solenoid and a head coupled to the locking arm of the locking member, the actuator being operable to retract the solenoid to disengage the locking arm from the biasing member.

9. The fluid supply system of claim 7, wherein the locking member further comprises a releasing arm extending from the cylindrical body in approximately a same orientation as the locking arm, wherein the releasing mechanism is fixedly attached to the first shaft and operable to act on the releasing arm of the locking member based on rotation of the first shaft to disengage the locking arm from the biasing member.

10. The fluid supply system of claim 9, wherein the releasing mechanism comprises a cam operable to apply a force to the releasing arm of the locking member based on rotation of the first shaft, wherein the locking member is operable to rotate in response to the force and disengage from the biasing member.

11. The fluid supply system of claim 1, wherein the valve member is a butterfly valve member.

12. A throttle assembly comprising:
  a housing having an inlet, an outlet, and a channel therebetween that fluidly connects the inlet and the outlet;
  a first shaft extending across the channel, the first shaft having a first end, a second end opposite the first end, and a first longitudinal axis extending between the first end and the second end, the first shaft being operable to rotate relative to the housing about the first longitudinal axis;
  a valve member disposed within the channel, coupled to the first shaft, and rotatable about the first longitudinal axis relative to the housing;
  a position controller coupled to the first shaft proximate to the first end; and
  a fluid shutoff assembly integrated with the throttle assembly, the fluid shutoff assembly comprising:
    a second shaft comprising a third end, a fourth end opposite the third end, and a second longitudinal axis extending between the third end and the fourth end, the second shaft being operable to rotate relative to the housing about the second longitudinal axis, the third end being adjacent to the second end,
    a locking member having a third longitudinal axis disposed parallel to the second longitudinal axis of the second shaft, the locking member being adjacent to the second shaft and comprising a locking arm extending in a direction from the third longitudinal axis toward the second shaft and being rotatable about the third longitudinal axis,
    a biasing member fixedly attached to the second shaft along the second longitudinal axis and comprising a fillet end,
    a releasing mechanism adjacent to the locking member that rotates the locking member about the third longitudinal axis, and
    a coupler comprising a first coupling hub fixed in rotation to the second end of the first shaft, and a second coupling hub fixed in rotation to the third end of the second shaft, the first coupling hub being interfaced with the second coupling hub.

13. The throttle assembly of claim 12, wherein the biasing member comprises
  a latch, and
  a torsion spring coupled to the latch, the torsion spring being wound about the second shaft between the latch and the fourth end of the second shaft,
  the latch being coupled to the second shaft between the coupler and the fourth end of the second shaft,
  the latch comprising the fillet end in contact with the locking arm when the second shaft is in a first position relative to the housing, the fillet end being disengaged from the locking arm when the second shaft is in a second position relative to the housing.

14. The throttle assembly of claim 12, wherein the first coupling hub comprises a first plurality of teeth, and the second coupling hub comprises a second plurality of teeth interfaced with the first plurality of teeth.

15. The throttle assembly of claim 12, wherein the releasing mechanism comprises an actuator having a solenoid and a head coupled to the locking arm of the locking member.

16. The throttle assembly of claim 12, wherein the locking member comprises a releasing arm extending in approximately a same direction as the locking arm, wherein the releasing mechanism is fixedly attached to the first shaft.

17. The throttle assembly of claim 16, wherein the releasing mechanism comprises a cam rotatable about the first longitudinal axis, and a lobe lift interfaced with the releasing mechanism.

18. A fluid shutoff assembly comprising:
  a housing;
  a first shaft disposed at least partly within the housing, the first shaft comprising a first end, a second end opposite the first end, and a first longitudinal axis extending between the first end and the second end, the first shaft being operable to rotate relative to the housing about the first longitudinal axis;
  a biasing member fixed in rotation to the first shaft;
  a locking member operable to restrain the first shaft in a first position relative to the housing via engagement with the biasing member, the biasing member applying a biasing force to the locking member when the first shaft is in the first position;
  a releasing mechanism operable to move the locking member relative to the biasing member and release the biasing member from contact with the locking member, wherein the biasing member moves the first shaft to a second position in response to the release;
  a second shaft disposed at least partly within the housing, the second shaft including a third end, a fourth end opposite the third end, and a second longitudinal axis extending between the third end and the fourth end, the second shaft being operable to rotate relative to the housing about the second longitudinal axis; and
  a coupler comprising a first coupling hub fixed in rotation to the first end of the first shaft, and a second coupling hub fixed in rotation to the third end of the second shaft, the first coupling hub being interfaced with the second coupling hub, the first coupling hub and the second coupling hub being operable to
    decouple the second shaft from rotation with the first shaft when the first shaft is in the first position, and
    couple the second shaft in rotation with the first shaft when the first shaft is in the second position.

19. The fluid shutoff assembly of claim 18, wherein a first end of the locking member is mounted on a pivot axis disposed parallel to the first longitudinal axis, the locking member being operable to rotate about the pivot axis,
  the locking member including a locking arm extending away from the pivot axis and toward the first shaft along a transverse direction, the transverse direction being transverse to the pivot axis, the locking arm being fixed in rotation with the first end of the locking member about the pivot axis.

20. The fluid shutoff assembly of claim 18, wherein the biasing member includes
  a latch fixed in rotation with the first shaft, and
  a torsion spring, a first end of the torsion spring being fixed to the latch, such that the first end of the torsion spring is fixed in rotation with the first shaft, a second end of the torsion spring being fixed to the housing.

* * * * *